US012007627B2

(12) United States Patent
Kozu

(10) Patent No.: US 12,007,627 B2
(45) Date of Patent: Jun. 11, 2024

(54) METHOD, MANUFACTURING METHOD, AND DESIGN SYSTEM OF PROGRESSIVE ADDITION LENS, AND PROGRESSIVE ADDITION LENS

(71) Applicant: HOYA LENS THAILAND LTD., Pathumthani (TH)

(72) Inventor: Kazuma Kozu, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 482 days.

(21) Appl. No.: 17/256,438

(22) PCT Filed: Jun. 28, 2019

(86) PCT No.: PCT/JP2019/025807
§ 371 (c)(1),
(2) Date: Dec. 28, 2020

(87) PCT Pub. No.: WO2020/004620
PCT Pub. Date: Jan. 2, 2020

(65) Prior Publication Data
US 2021/0271108 A1 Sep. 2, 2021

(30) Foreign Application Priority Data
Jun. 28, 2018 (JP) .................. 2018-123739

(51) Int. Cl.
*G02C 7/02* (2006.01)
*G02C 7/06* (2006.01)
(52) U.S. Cl.
CPC ............. *G02C 7/027* (2013.01); *G02C 7/025* (2013.01); *G02C 7/063* (2013.01); *G02C 7/068* (2013.01)

(58) Field of Classification Search
CPC ........ G02C 7/027; G02C 7/025; G02C 7/063; G02C 7/068
(Continued)

(56) References Cited

U.S. PATENT DOCUMENTS

2004/0233385 A1 11/2004 Kitani et al.
2009/0066912 A1 3/2009 Miura
(Continued)

FOREIGN PATENT DOCUMENTS

JP 2011-107239 A 6/2011
JP 2012-185448 A 9/2012
(Continued)

OTHER PUBLICATIONS

Mar. 3, 2022 Search Report issued in European Patent Application No. 19826839.3.
(Continued)

*Primary Examiner* — James R Greece
(74) *Attorney, Agent, or Firm* — Oliff PLC

(57) ABSTRACT

A progressive addition lens design method includes adjusting a lens surface shape to bring a difference between a first state when an object at a first location in a wearer's front and on the wearer's medial plane is visually recognized and a second state when an object at a second location positioned on the first location side in the horizontal direction at a constant height in the vertical direction is visually recognized in a plane parallel to a frontal plane and includes the first location at the time the lens is worn closer to a difference between a third state when an object at the first location is visually recognized and a fourth state when an object at the second location is visually recognized at the time a reference single focal lens corresponding to the progressive addition lens is worn or at the time equivalent to a naked eye.

10 Claims, 26 Drawing Sheets

(58) Field of Classification Search
USPC .................................................. 351/159.42
See application file for complete search history.

(56) References Cited

U.S. PATENT DOCUMENTS

| | | |
|---|---|---|
| 2011/0116038 A1 | 5/2011 | Suzuki |
| 2012/0105801 A1 | 5/2012 | Yamakaji |
| 2012/0229756 A1 | 9/2012 | Kato et al. |
| 2013/0027659 A1 | 1/2013 | Shaw |
| 2013/0179297 A1 | 7/2013 | Yamakaji |
| 2017/0351116 A1 | 12/2017 | Kaga et al. |

FOREIGN PATENT DOCUMENTS

| | | | |
|---|---|---|---|
| JP | 2013-41125 A | 2/2013 | |
| WO | 99/04307 A1 | 1/1999 | |
| WO | 03/100505 A1 | 12/2003 | |
| WO | 2006/123503 A1 | 11/2006 | |
| WO | WO-2006123503 A1 * | 11/2006 | ............ G02C 7/061 |
| WO | 2016/104811 A1 | 6/2016 | |

OTHER PUBLICATIONS

Dec. 29, 2020 International Preliminary Report on Patentability issued in International Patent Application No. PCT/JP2019/025807.
Sep. 24, 2019 International Search Report issued in International Patent Application No. PCT/JP2019/025807.

\* cited by examiner

BASIC DESIGN OF INTEGRATED LENS

FIG. 18
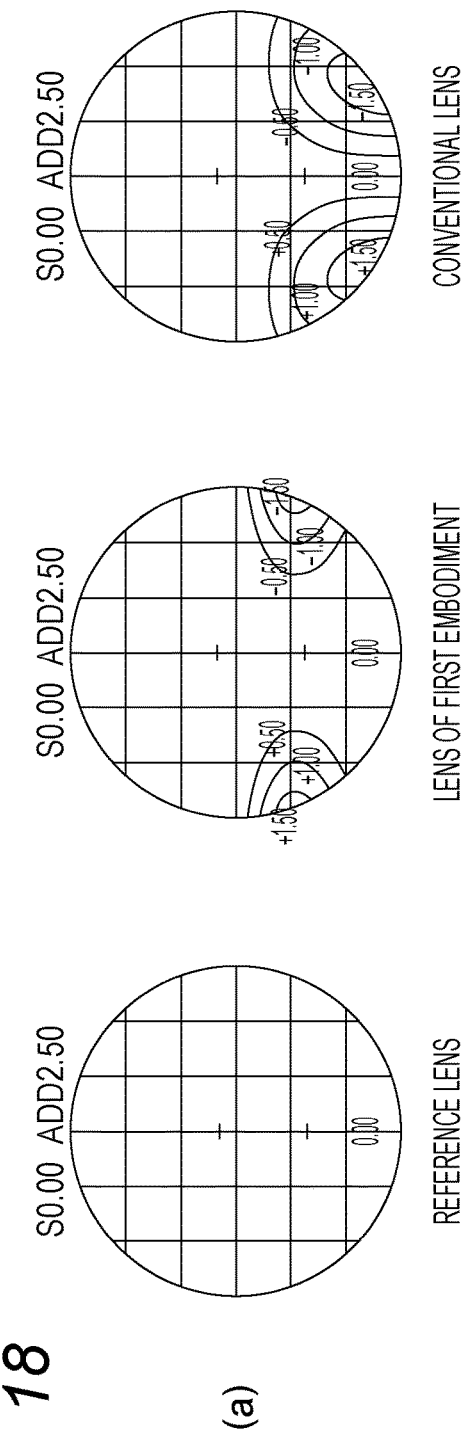
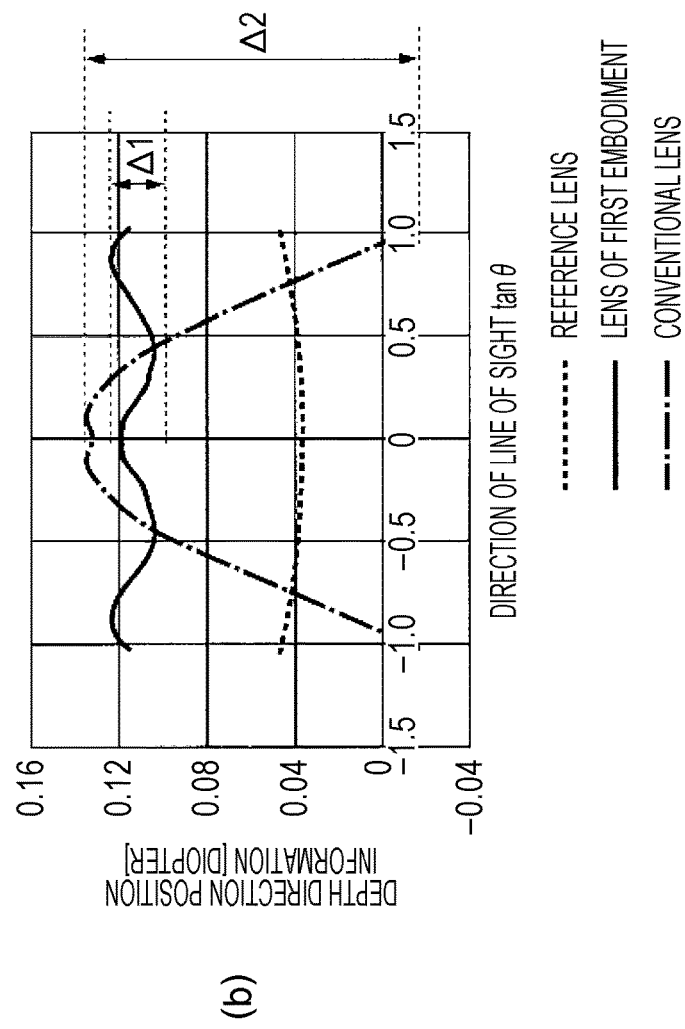

FIG. 21
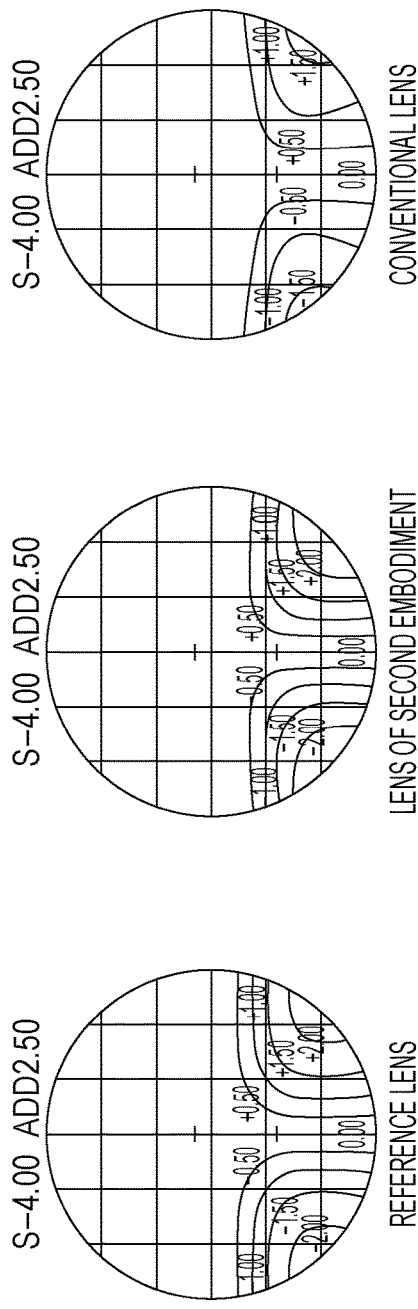
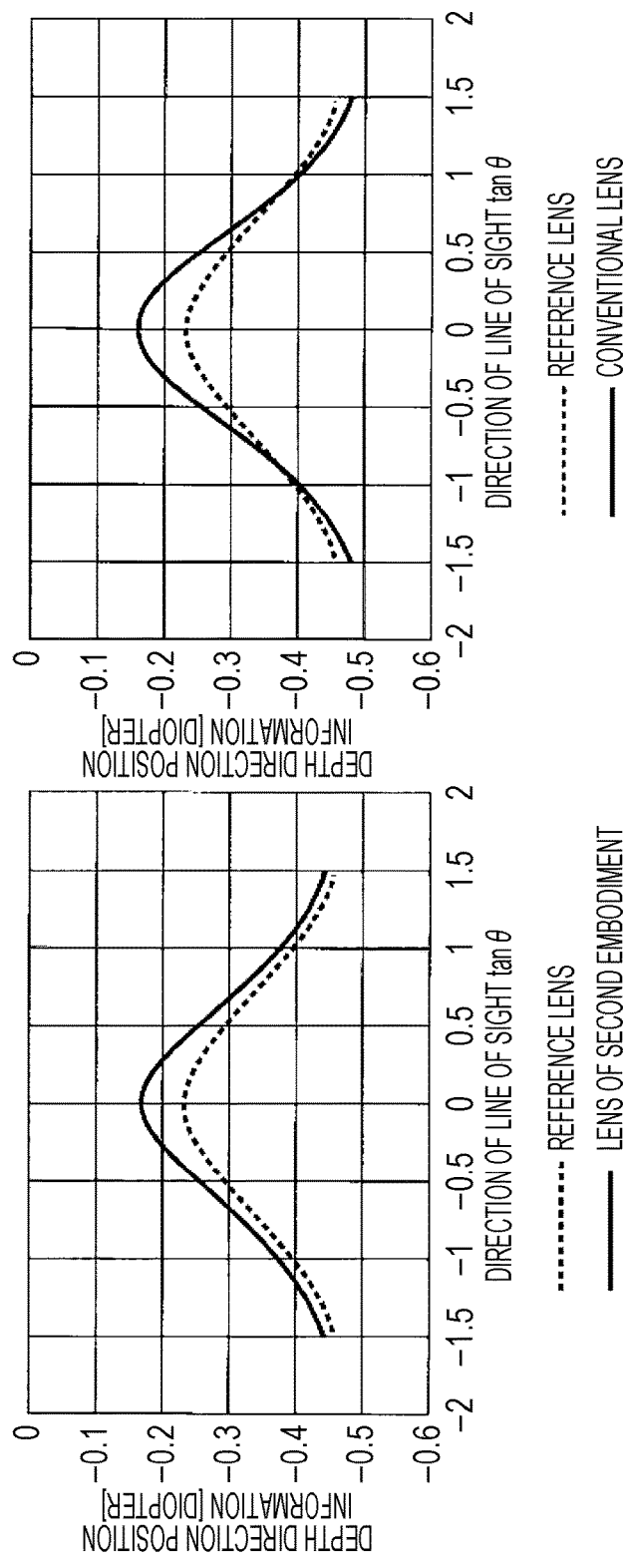

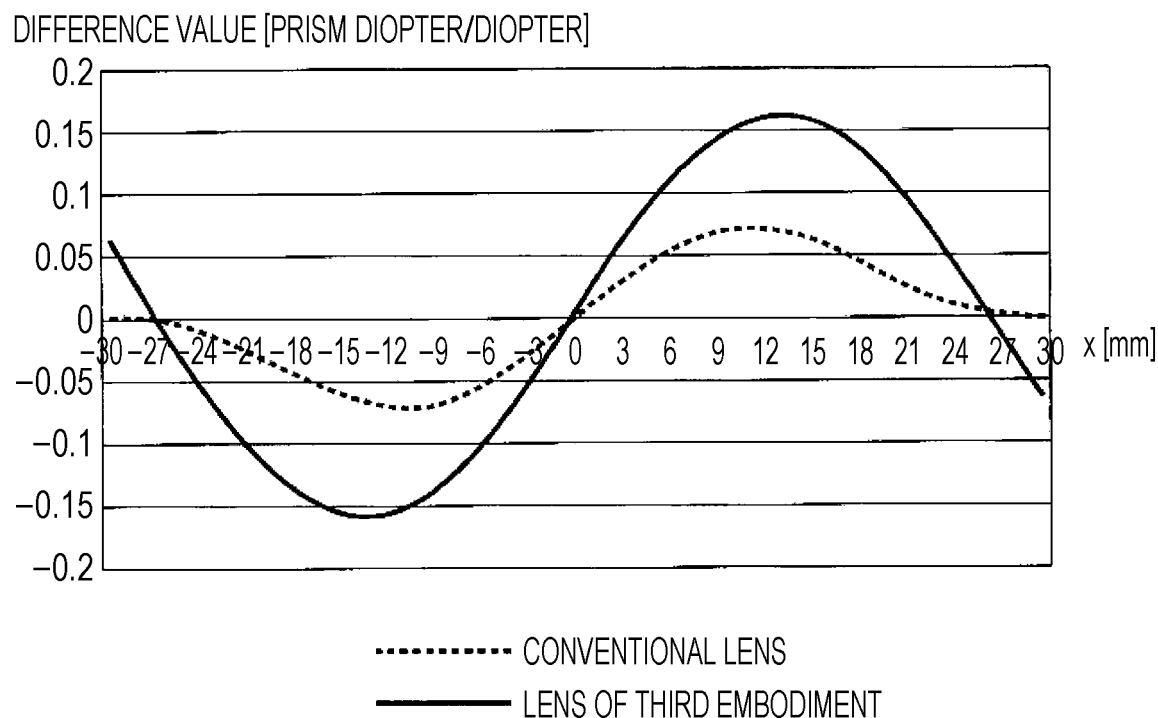

METHOD, MANUFACTURING METHOD, AND DESIGN SYSTEM OF PROGRESSIVE ADDITION LENS, AND PROGRESSIVE ADDITION LENS

TECHNICAL FIELD

The present invention relates to a design method, a manufacturing method, and a design system of a progressive addition lens, and a progressive addition lens. Note that the entire content of Japanese Patent Application No. 2018-123739, which is the basis of priority, can be referred to in the present description.

BACKGROUND ART

In spectacle lenses, one that includes a portion in which power changes continuously is known. Such a spectacle lens is also called a progressive addition lens.

What is called a progressive multifocal lens including a distance portion and a near portion is exemplified. Other examples include an aspherical single focal lens having power that changes as a distance from one region for viewing over a predetermined distance increases.

For example, in a progressive multifocal lens, a curve called a main line of sight is set as a reference line when power changes continuously from a distance portion to a near portion.

The main line of sight refers to a line that is formed by gathering of portions, through which the line of sight passes most frequently, of a spectacle lens when the wearer wears the spectacle lens and shifts his or her line of sight from the top (upward direction) to the bottom (downward direction) or vice versa in a vertical direction which is a direction toward the top and the bottom. This main line of sight is the basis for designing a spectacle lens. A lens shape of the progressive addition lens is designed so that power that changes from a distance portion to a near portion along the main line of sight has a power change specified in prescription information.

Patent Literature 1 discloses a technique relating to a progressive addition lens including a surface on the object side (outer surface, convex surface) and a surface on the eyeball side (inner surface, concave surface). Specifically, Patent Literature 1 discloses a technique of controlling power in vertical and horizontal directions at a distance reference point, which is a distance power measurement position on the outer surface, and power in vertical and horizontal directions at a near reference point, which is a near power measurement position on the outer surface to satisfy a predetermined relationship. It is disclosed that this control reduces a distance and near perspective magnification difference, which is peculiar to a progressive addition lens, and reduces the distortion perceived by the wearer.

Patent Literature 2 discloses that the action of outprism that may be generated in a portion through which the main line of sight considering the convergence of the wearer passes may be generated. Then, it is disclosed that a shape of inprism that cancels at least part of the action of the outprism is provided in a portion from a distance portion to a near portion on the main line of sight of the progressive addition lens. In this manner, it is disclosed that a state in which greater convergence is forced by the action of outprism on the main line of sight can be reduced by the action of inprism.

CITATION LIST

Patent Literature

Patent Literature 1: WO 03/100505 A
Patent Literature 2: WO 2016/104811 A

SUMMARY OF INVENTION

Technical Problem

The present inventor has focused on a problem peculiar to a progressive addition lens described below.

(Distortion in depth direction) FIG. 1 is a schematic diagram showing a right eye lens 10R and a left eye lens 10L, which are conventional progressive addition lenses, and a position of an apparent target object surface 20 for the wearer as seen through a spectacle lens 10 when viewed from the top in the top-bottom direction (vertically upward direction) to the bottom in the top-bottom direction (vertically downward direction). Hereinafter, the apparent target object surface 20 is also referred to as the "apparent surface 20".

In a case of a conventional progressive addition lens, a state A when an object at a location O in front of the wearer by a finite distance and on a medial plane of the wearer is visually recognized is assumed.

FIG. 2 is a schematic explanatory view showing a state, in which a position in the depth direction of the apparent surface 20 seen through the progressive addition lens is located at a position on the front side with respect to the depth direction of an actual target object surface 22 in the state A when the object at the location O in front of the wearer by a finite distance and on a medial plane of the wearer is visually recognized. Hereinafter, the actual target object surface 22 is also referred to as the "actual surface 22".

As shown in FIG. 2, the position in the depth direction of the apparent surface 20 is located on the front side with respect to the position in the depth direction of the actual surface 22.

On the other hand, assume a state B when an object at a location P positioned on the side in the horizontal direction of the location O at a constant height in the vertical direction with respect to the location O is visually recognized in a plane that is parallel to a frontal plane and includes the location O. In the state B, the position in the depth direction of the apparent surface 20 seen through the spectacle lens 10 is positioned on the depth side with respect to the depth direction of the actual surface 22 contrary to the above, as shown in FIG. 1.

That is, in the case of a progressive addition lens, a change occurs in the apparent position in the depth direction generated by a convergence difference between the left and right eyes during binocular vision. Moreover, the apparent position in the depth direction at the location O on the front and the apparent position in the depth direction at the location P on the side are often different. As a result, distortion of the image in the depth direction may be generated. If this distortion of the image is eliminated, a comfortable wearing feeling can be obtained.

(Eye Position Difference in Vertical Direction)

FIG. 3 is a diagram showing a state, in which an eye position difference in the vertical direction is generated between a right eye R and a left eye L when an object at a short distance and on the side is looked at through the right eye lens 10R and the left eye lens 10L, which are conventional progressive addition lenses, when viewed from the horizontal direction.

As shown in FIG. 3, in a case where a difference in a direction of the line of sight with respect to the vertical direction is generated between both eyes when a spectacle lens is worn and one point is gazed at, the wearer forcibly shifts to eye position states which are different on the left and right in the vertical direction in order to recognize the same object in the state of binocular vision. Note that, in the present description, the direction of the line of sight refers to the direction of the line of sight on the eyeball side, and refers to the direction in which the right eyeball or the left eyeball faces.

In general, the human eye has a small tolerance for the difference in a prismatic effect in the vertical direction, and even if the same object can be recognized, an unpleasant wearing feeling is often caused. In a case where the degree exceeds the wearer's tolerance, the image will be perceived as diplopia. If the eye position differences in the vertical direction is eliminated, the perception of such an image can be suppressed, and as a result, a comfortable wearing feeling can be obtained.

In view of the above, an object of one embodiment of the present invention is to provide a technique of obtaining a comfortable wearing feeling by reducing the influence of an unnecessary prismatic effect caused by a progressive action.

Solution to Problem

As a method of solving the problem peculiar to the progressive addition lens, it is effective to bring a state when the progressive addition lens is worn closer to a state when a single focal lens is worn or a state equivalent to the naked eye (described later).

On the other hand, according to this method, the progressive addition lens will be designed so as to bring, for example, a state in which an object on the side at a finite distance is viewed through the progressive addition lens ("state B, progressive side view state B" described later) closer to a state in which the object is viewed through a single focal lens or a state equivalent to the naked eye ("state D, reference side view state D" described later).

However, in that case, if a focus is placed only on the difference between the progressive side view state B and the reference side view state D, a state in which an element generated by an unnecessary prismatic effect due to the progressive action as listed in the section of the problem of the present invention and an element generated by a necessary prismatic effect caused by addition power for supporting adjusting power in the progressive action coexist is obtained. The "element generated by a necessary prismatic effect" includes, for example, a convergence amount required when viewing through a lens to which addition power is added to support adjusting power. The convergence amount indicates the degree to which the left and right eyes face inward when looking at an object at a short distance, and is also referred to as an inward facing amount in the present description. In addition, the "inward facing amount" in the present description may indicate the degree of one eye facing inward, or may indicate the degree of both eyes facing inward.

In a state where an element generated by an unnecessary prismatic effect caused by the progressive action and an element caused by a necessary prismatic effect coexist, the solution of the problem by selecting and reducing the influence generated by the unnecessary prismatic effect caused by the progressive action is difficult to achieve.

In view of the above, the present inventor has focused on a difference V between the state when an object at the location O in front of the wearer at a finite distance and on the medial plane of the wearer is visually recognized (state A, progressive front view state A described later) at the time the progressive addition lens is worn and the progressive side view state B described above.

One of the features of this focus is that it accepts rather than eliminates a convergence angle and an eye position difference between the left and right eyes generated by the prismatic effect caused by the progressive action of the progressive addition lens in the progressive front view state A.

In the front view state at a finite distance, both the right eye and the left eye face inward. For this reason, the distortion in the depth direction and the eye position difference in the vertical direction in the progressive front view state A already include a basic element generated by the inward facing. Then, by focusing on the difference between the front view state and the side view state, the basic element generated by the inward facing amount is subtracted. In other words, both the progressive addition lens for the right eye and the progressive addition lens for the left eye accept the convergence angle and the eye position difference of the left and right eyes when the line of sight passes through the main line of sight. As a result, the difference between the difference V and a difference W is in a state in which the element generated by the unnecessary prismatic effect caused by the progressive action is mainly reflected. That is, it is possible to examine the element generated by the unnecessary prismatic effect caused by the progressive action.

Similarly, a focus has been placed on the difference W between a reference front view state C and a reference side view state D even in the state of the single focal lens or equivalent to the naked eye. Then, a method of bringing the state when the progressive addition lens is worn closer to the state when the single focal lens is worn or the state equivalent to the naked eye by designing the progressive addition lens so as to bring the difference V closer to the difference W has been arrived at.

Aspects below have been made based on the above findings.

A first aspect of the present invention is a design method of a progressive addition lens including adjusting a surface shape of a progressive addition lens so as to bring a difference V between a state A when an object at a location O in front of a wearer by a finite distance and on a medial plane of the wearer is visually recognized and a state B when an object at a location P positioned on the side in a horizontal direction of the location O at a constant height in a vertical direction with respect to the location O is visually recognized in a plane that is parallel to a frontal plane and includes the location O at the time the progressive addition lens is worn closer to a difference W between a state C when an object at the location O is visually recognized and a state D when an object at the location P is visually recognized at the time a reference single focal lens corresponding to the progressive addition lens is worn or at the time equivalent to the naked eye.

A second aspect of the present invention is an aspect according to the first aspect, in which the difference V is a difference between an angle difference VA between a direction of the line of sight of the right eye and a direction of the line of sight of the left eye in the state A and an angle difference VB between a direction of the line of sight of the right eye and a direction of the line of sight of the left eye in the state B, the difference W is a difference between an angle difference WC between a direction of the line of sight of the right eye and a direction of the line of sight of the left eye in the state C and an angle difference WD between a direction of the line of sight of the right eye and a direction of the line of sight of the left eye in the state D, and a surface shape of a progressive addition lens is adjusted to change the angle difference VB in the state B so as to include the difference V within a predetermined allowable range from the difference W.

A third aspect of the present invention is an aspect according to the second aspect, in which when an integrated eye with the center of rotation set on a medial plane of the wearer and at an intermediate position between the right eye and the left eye and a progressive addition lens for the integrated eye are assumed, the angle difference VA is a difference between an angle difference VAR between a direction of the line of sight of the right eye and a direction of the line of sight of the integrated eye and an angle difference VAL between a direction of the line of sight of the left eye and a direction of the line of sight of the integrated eye in the state A, the angle difference VB is a difference between an angle difference VBR between a direction of the line of sight of the right eye and a direction of the line of sight of the integrated eye and an angle difference VBL between a direction of the line of sight of the left eye and a direction of the line of sight of the integrated eye in the state B, the angle difference WC is a difference between an angle difference WCR between a direction of the line of sight of the right eye and a direction of the line of sight of the integrated eye and an angle difference WCL between a direction of the line of sight of the left eye and a direction of the line of sight of the integrated eye in the state C, and the angle difference WD is a difference between an angle difference WDR between a direction of the line of sight of the right eye and a direction of the line of sight of the integrated eye and an angle difference WDL between a direction of the line of sight of the left eye and a direction of the line of sight of the integrated eye in the state D.

A fourth aspect of the present invention is an aspect according to the third aspect, in which a correction amount for a progressive addition lens for the right eye and a correction amount for a progressive addition lens for the left eye when a surface shape of a progressive addition lens is adjusted are apportioned according to at least any of a ratio of the angle difference VAR to the angle difference VAL, a ratio of the angle difference VBR to the angle difference VBL, a ratio of the angle difference WCR to the angle difference WCL, and a ratio of the angle difference WDR to the angle difference WDL.

A fifth aspect of the present invention is an aspect according to the third or fourth aspect, in which as an equivalent spherical power of a progressive addition lens for the integrated eye, an average value of an equivalent spherical power of a progressive addition lens for the right eye and an equivalent spherical power of a progressive addition lens for the left eye is employed.

A sixth aspect of the present invention is an aspect according to any one of the second to fifth aspects, in which a predetermined allowable range from the difference W is within 50% of the difference W.

A seventh aspect of the present invention is a manufacturing method of a progressive addition lens including:

a design step for performing the design method of a progressive addition lens according to any one of first to sixth; and a processing step for obtaining a progressive addition lens after the design step.

An eighth aspect of the present invention is a design system of a progressive addition lens including:

a software module that adjusts a surface shape of a progressive addition lens so as to bring a difference V between a state A when an object at a location O in front of the wearer by a finite distance and on a medial plane of the wearer is visually recognized and a state B when an object at a location P positioned on side in a horizontal direction of the location O at a constant height in a vertical direction with respect to the location O is visually recognized in a plane that is parallel to a frontal plane and includes the location O at the time the progressive addition lens is worn closer to a difference W between a state C when an object at the location O is visually recognized and a state D when an object at the location P is visually recognized at the time a reference single focal lens corresponding to the progressive addition lens is worn or at the time equivalent to the naked eye.

A ninth aspect of the present invention is a progressive addition lens including: a near portion having power used for near vision; a distance portion having power for seeing an object farther than near vision; and an intermediate portion having a progressive action in which power changes progressively between the distance portion and the near portion, the progressive addition lens further including:

a prismatic effect adjustment region that brings a distortion degree of an image due to an unnecessary prismatic effect caused by a progressive action closer to a distortion degree of an image at the time a reference single focal lens corresponding to a progressive addition lens is worn or at the time equivalent to the naked eye.

A tenth aspect of the present invention is an aspect according to the ninth aspect, in which the prismatic effect adjustment region includes a region of a side portion deviating in a horizontal direction from the main line of sight.

An eleventh aspect of the present invention is an aspect according to the ninth or tenth aspect, in which at least either one of the following two conditions is satisfied:

[First Condition]

in a plot when a lens horizontal direction is a horizontal axis and a surface prism difference in a vertical direction normalized by addition power is a vertical axis, a difference between a maximum value and a minimum value of a surface prism difference in the vertical direction in a predetermined location α on a predetermined horizontal cross section of the near portion is 0.2 [prism diopter/diopter] or more; and

[Second Condition]

in a plot when a lens horizontal direction is a horizontal axis and a surface prism difference in a horizontal direction normalized by addition power is a vertical axis, an absolute value of a surface prism difference in the horizontal direction is 0.25 [prism diopter/diopter] or more at a position of x=0 in a predetermined location γ on a predetermined horizontal cross section of the near portion, and a position of x=0 in the predetermined location γ is directly below a prism reference point or directly below a midpoint of two alignment reference marks of a progressive addition lens.

A twelfth aspect of the present invention is an aspect according to the eleventh aspect, in which a position of the predetermined horizontal cross section is a position where the addition power of 85% to 100% is achieved.

Preferably, the difference V is included within a predetermined allowable range from the difference W by adjusting the surface shape of the progressive addition lens to change only the angle difference VB in the state B.

Preferably, as the equivalent spherical power of the reference single focal lens, the equivalent spherical power of the progressive addition lens is employed.

Preferably, the region for adjusting the prismatic effect includes a region in the side portion deviating in the horizontal direction from the main line of sight. More preferably, a region including a region in the side portion deviating in the horizontal direction from the main line of sight and also includes a near portion is defined as the prismatic effect adjustment region.

The progressive addition lens may be read as a pair of progressive addition lenses including a progressive addition lens for the right eye and a progressive addition lens for the left eye.

It is preferable to satisfy [First condition] and [Second condition].

Note that it is also preferable to satisfy a condition described below.

[Third Condition]

A plot of the progressive addition lens when the horizontal axis is the direction of the line of sight (tan θ) and the vertical axis is the depth direction position information (unit: diopter) does not intersect a plot at the time the reference single focal lens corresponding to the progressive addition lens is worn or at the time equivalent to the naked eye.

Advantageous Effects of Invention

According to one embodiment of the present invention, it is possible to provide a technique for obtaining a comfortable wearing feeling by reducing the influence generated by an unnecessary prismatic effect caused by a progressive action.

BRIEF DESCRIPTION OF DRAWINGS

FIG. 18(a) shows a difference in directions of the line of sight between both eyes in the vertical direction, that is, distribution of an eye position difference in the vertical direction when a reference lens when a spectacle lens pair is manufactured, a lens of a first embodiment, and a conventional lens are worn, in which the horizontal axis represents a horizontal component of a direction of the line of sight and the vertical axis represents a vertical component of a direction of the line of sight. FIG. 18(b) is a graph showing a change in an apparent position in the depth direction of a target object surface 22, that is, distortion in the depth direction, in which the vertical axis shows depth direction position information [diopter], and the horizontal axis shows a direction [tan θ] of the line of sight in the horizontal direction.

FIG. 21(a) shows a difference in directions of the line of sight between both eyes in the vertical direction, that is, distribution of an eye position difference in the vertical direction when a reference lens when a spectacle lens pair is manufactured, a lens of a second embodiment, and a conventional lens are worn, in which the horizontal axis represents a horizontal component of a direction of the line of sight and the vertical axis represents a vertical component of a direction of the line of sight. FIG. 21(b) is a graph showing a change in an apparent position in the depth direction of a target object surface 22, that is, distortion in the depth direction, in which the vertical axis shows depth direction position information [diopter], and the horizontal axis shows a direction [tan θ] of the line of sight in the horizontal direction.

FIG. 22 is a diagram showing a change in a surface prism difference in the vertical direction in the lens of a third embodiment and the conventional lens, in which the vertical axis shows a surface prism difference [prism diopter/diopter] in the vertical direction and the horizontal axis shows an x coordinate [mm] on y=−14 mm.

DESCRIPTION OF EMBODIMENTS

Figure 1:
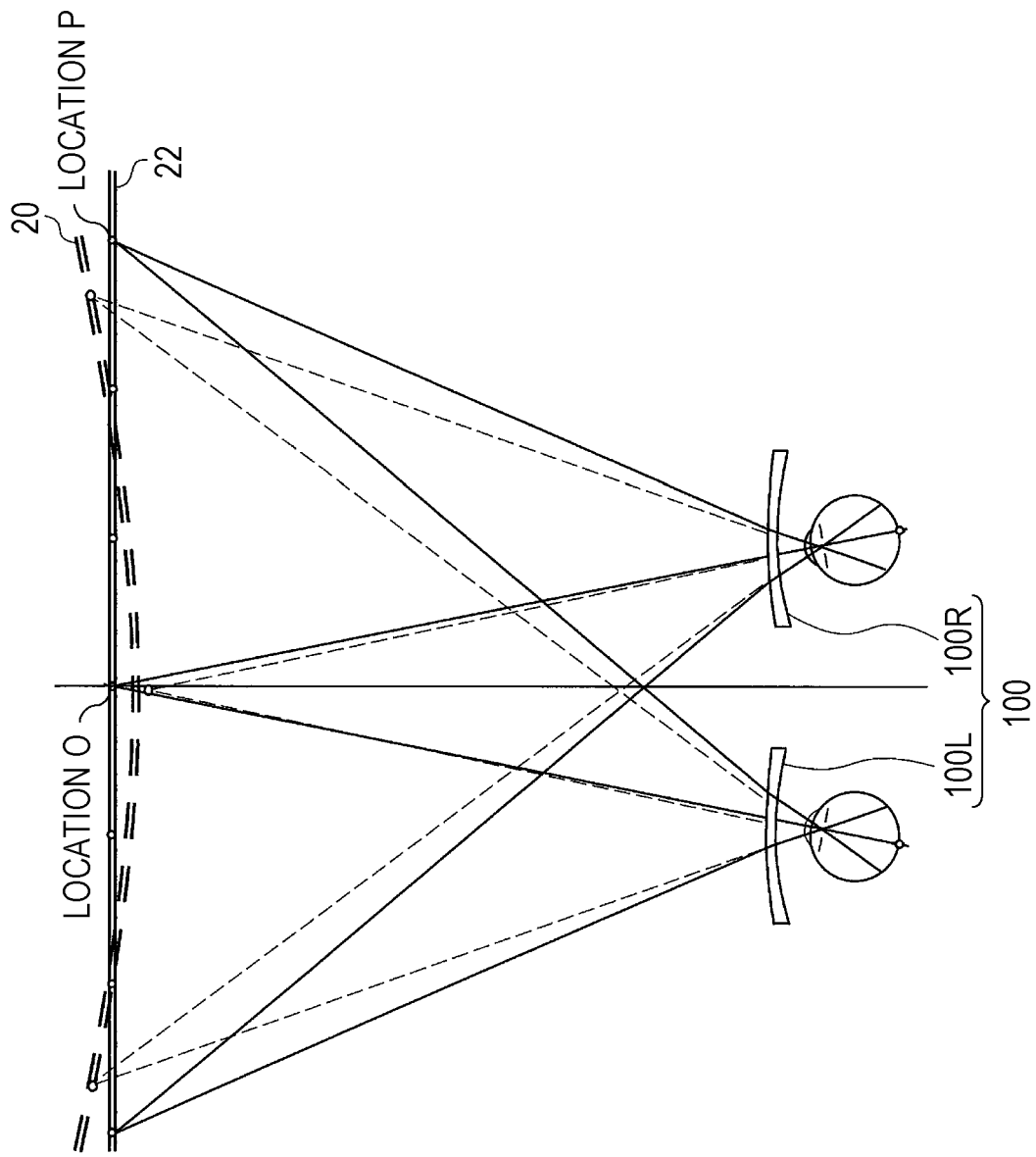
FIG. 1 is a schematic diagram showing a right eye lens and a left eye lens, which are conventional progressive addition lenses, and a position of an apparent target object surface for the wearer as seen through the progressive addition lens when viewed from the top in the top-bottom direction (vertically upward direction) to the bottom in the top-bottom direction (vertically downward direction).
Figure 2:
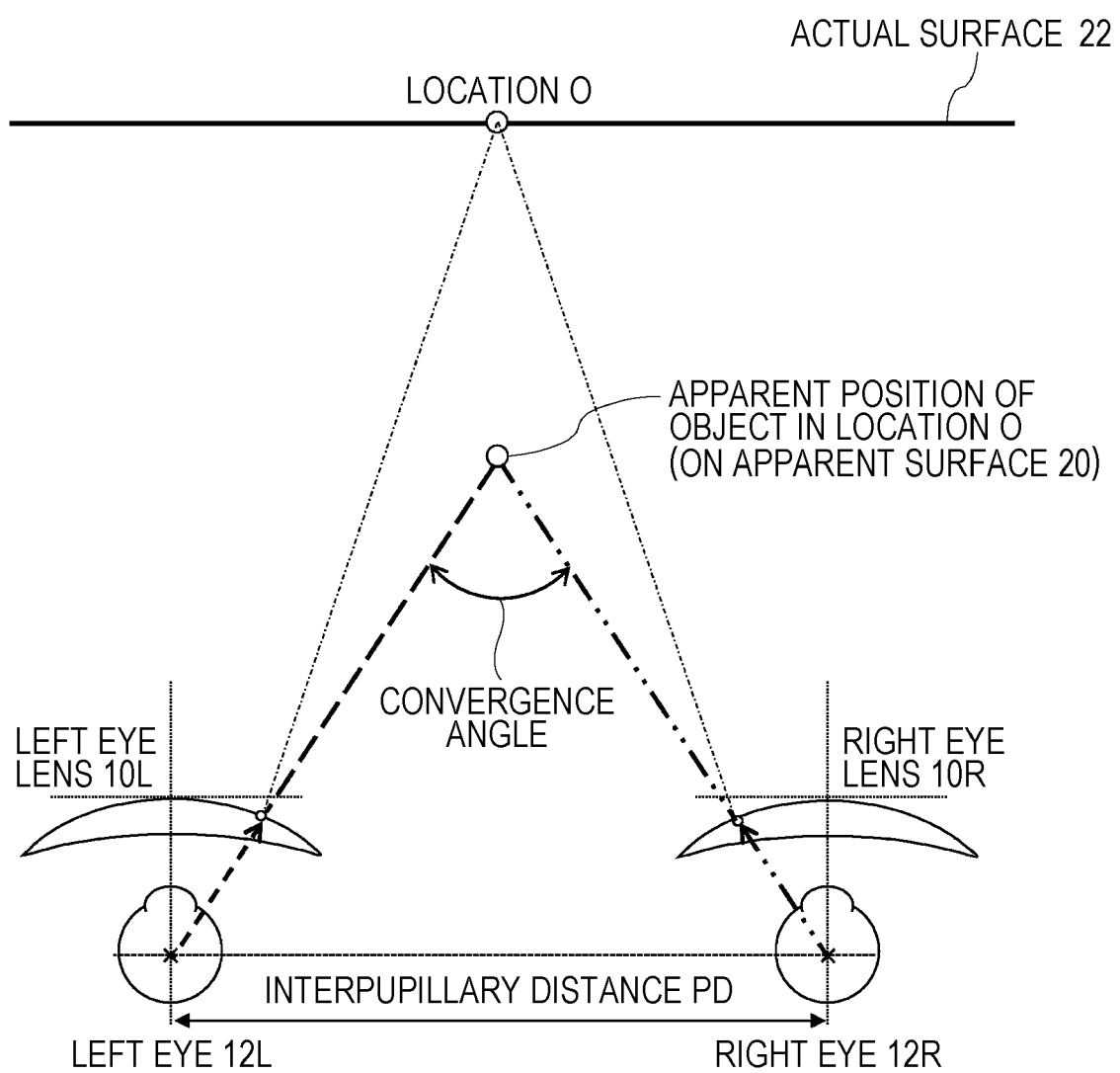
FIG. 2 is a further schematic diagram showing a state, in which a position in the depth direction of the apparent surface seen through a conventional progressive addition lens is located at a position on the front side with respect to the depth direction of an actual target object surface in a state A when the object at a location O in front of the wearer by a finite distance and on a medial plane of the wearer is visually recognized.
Figure 3:
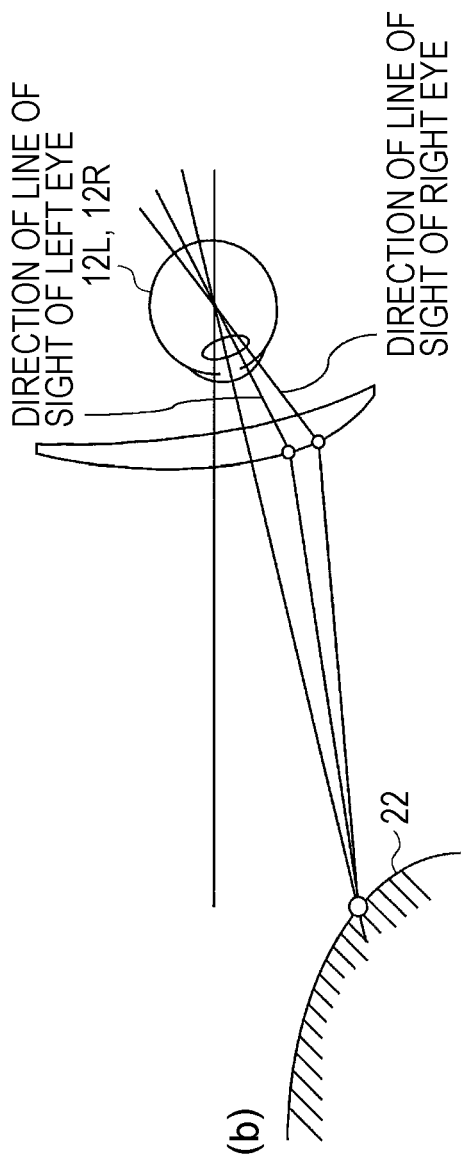
FIG. 3 is a schematic diagram showing a state, in which an eye position difference in the vertical direction is generated between a right eye and a left eye when an object at a short distance and on the side is looked at through the right eye lens and the left eye lens, which are conventional progressive addition lenses, when viewed from the horizontal direction.

Hereinafter, one aspect of the present invention will be described. Description below is exemplary and the present invention is not limited to the exemplified aspect.

In the present description, the vertical direction is a Y direction, the horizontal direction is an X direction, and the direction perpendicular to both directions is a Z direction. The Z direction is a front view direction and is also a direction perpendicular to the medial plane and the frontal plane.

Note that a direction of the line of sight in each of states A, B, C, and D can be grasped by a simulation employing a ray tracing method. As a result, a position through which the line of sight passes on a lens can also be grasped by the ray tracing method. Since a publicly-known method is preferably employed as the ray tracing method, the details will be omitted.

[Design Method of Progressive Addition Lens According to One Aspect of Present Invention]

A specific configuration of a design method of a progressive addition lens according to one aspect of the present invention is as described below.

"A design method of a progressive addition lens including
adjusting a surface shape of a progressive addition lens so as to bring
a difference V between a state A when an object at a location O in front of a wearer by a finite distance and on a medial plane of the wearer is visually recognized and
a state B when an object at a location P positioned on the side in a horizontal direction of the location O at a constant height in a vertical direction with respect to the location O is visually recognized in a plane that is parallel to a frontal plane and includes the location O at the time the progressive addition lens is worn
closer to
a difference W between a state C when an object at the location O is visually recognized and
a state D when an object at the location P is visually recognized at the time a reference single focal lens corresponding to the progressive addition lens is worn or at the time equivalent to the naked eye."

The progressive addition lens is a lens that includes, as regions, a portion that is provided on an upper portion of the lens and has power for viewing a distant object, that is, a distance portion having power used for distance vision, a portion that is provided on a lower portion of the lens and has power for viewing a near object, that is, a near portion having power used for near vision, and an intermediate portion provided between the distance portion and the near portion, and in which power gradually changes between the distance portion and the near portion.

The distance portion is not particularly limited as long as the distance portion is a region for viewing farther than a near distance. For example, the distance portion may be a region for viewing a predetermined distance (4 m to 1 m) instead of infinity. As a spectacle lens including such a region, there are an intermediate-near lens corresponding to an object distance of an intermediate distance (1 m to 40 cm) to a near distance (40 cm to 10 cm) and a near-near lens corresponding to a distance within the near distance.

One aspect of the present invention uses a state at the time the progressive addition lens is worn. That is, a state in which binocular vision is performed by wearing a pair of progressive addition lenses including a progressive addition lens for the right eye and a progressive addition lens for the left eye is used. A pair of progressive addition lenses is also simply referred to as a lens pair or a spectacle lens pair. Further, the progressive addition lens for the right eye is also simply referred to as a right eye lens, and the progressive addition lens for the left eye is also simply referred to as a left eye lens.

Figure 4A:
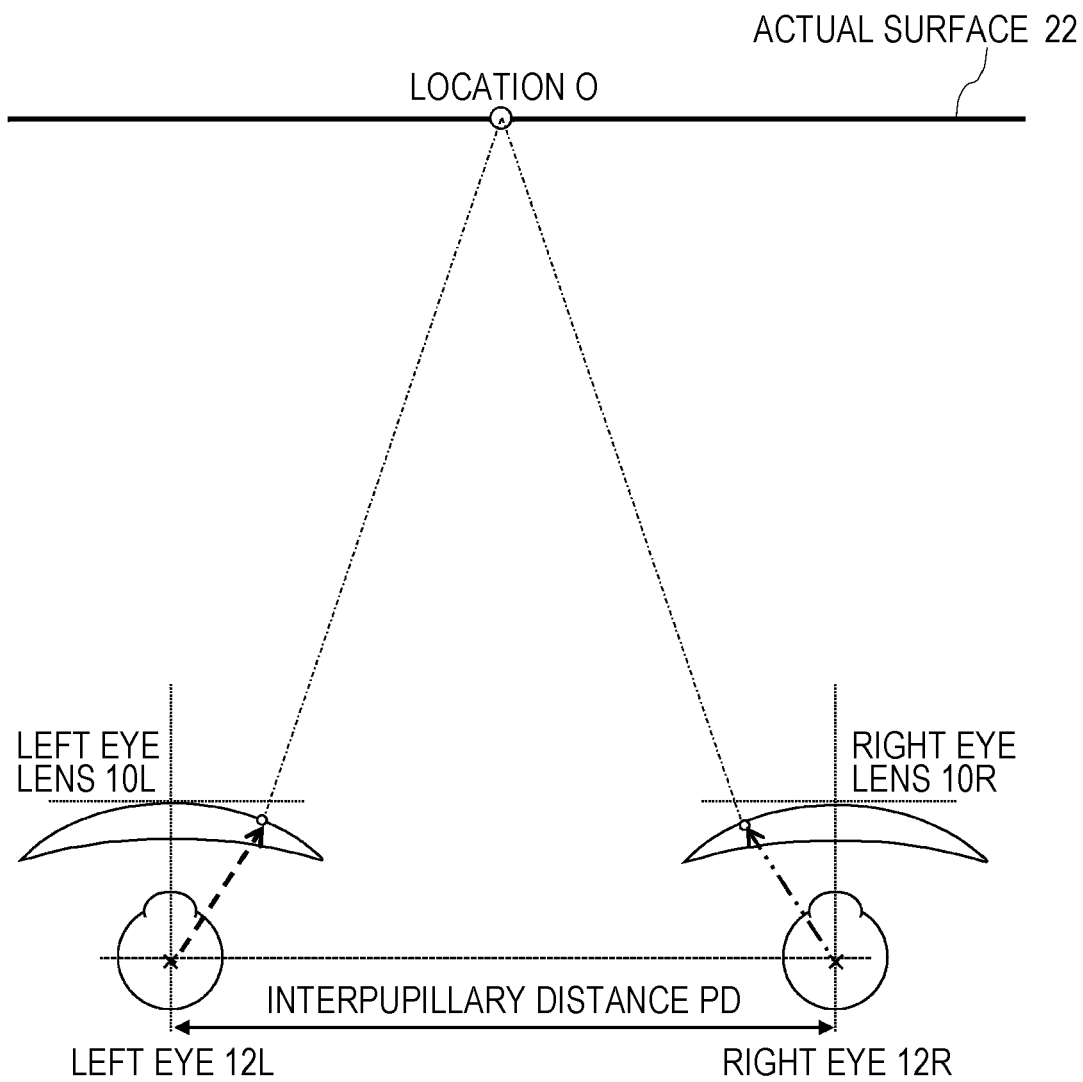
FIG. 4A is a diagram showing a direction of the line of sight of both eyes in a progressive front view state A when a design method of one aspect of the present invention is employed when viewed from the vertically upward direction to the vertically downward direction.

FIG. 4A is a diagram showing a direction of the line of sight of both eyes in a progressive front view state A when a design method of one aspect of the present invention is employed when viewed from the vertically upward direction to the vertically downward direction.

The state A refers to a state when an object at a location O in front of the wearer in a finite distance and on the medial plane of the wearer is visually recognized. The state A is also referred to as the progressive front view state A. The medial plane is a plane that divides the body into left and right in parallel to the median of an animal body that is bilaterally symmetrical.

Figure 5:
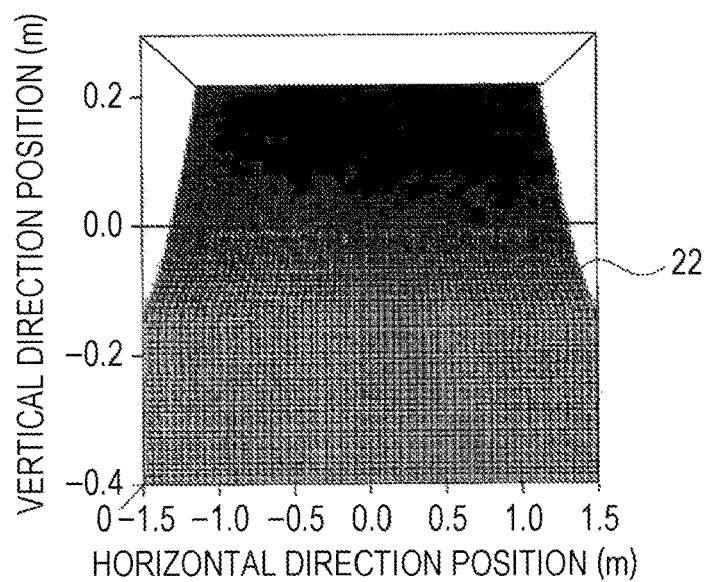
FIG. 5 is a diagram showing an example of a target object surface.

FIG. 5 is a diagram showing an example of a target object surface.

There is no particular limitation on a specific numerical value of the finite distance. For example, the finite distance may be appropriately set within the range of 4 m to 10 cm. Further, the target object surface having an upper portion at a long distance from the wearer and a lower portion at a short distance may be appropriately set as shown in FIG. 5, and the location O and a location P described later may be set on the target object surface. In the present description, as an example, a case where the distance from the wearer of the location O is 40 cm is illustrated.

It is preferable that the target object surface have a portion in which the distance from a progressive addition lens 10 continuously decreases as the target object surface is positioned downward in the vertical direction.

Figure 4B:
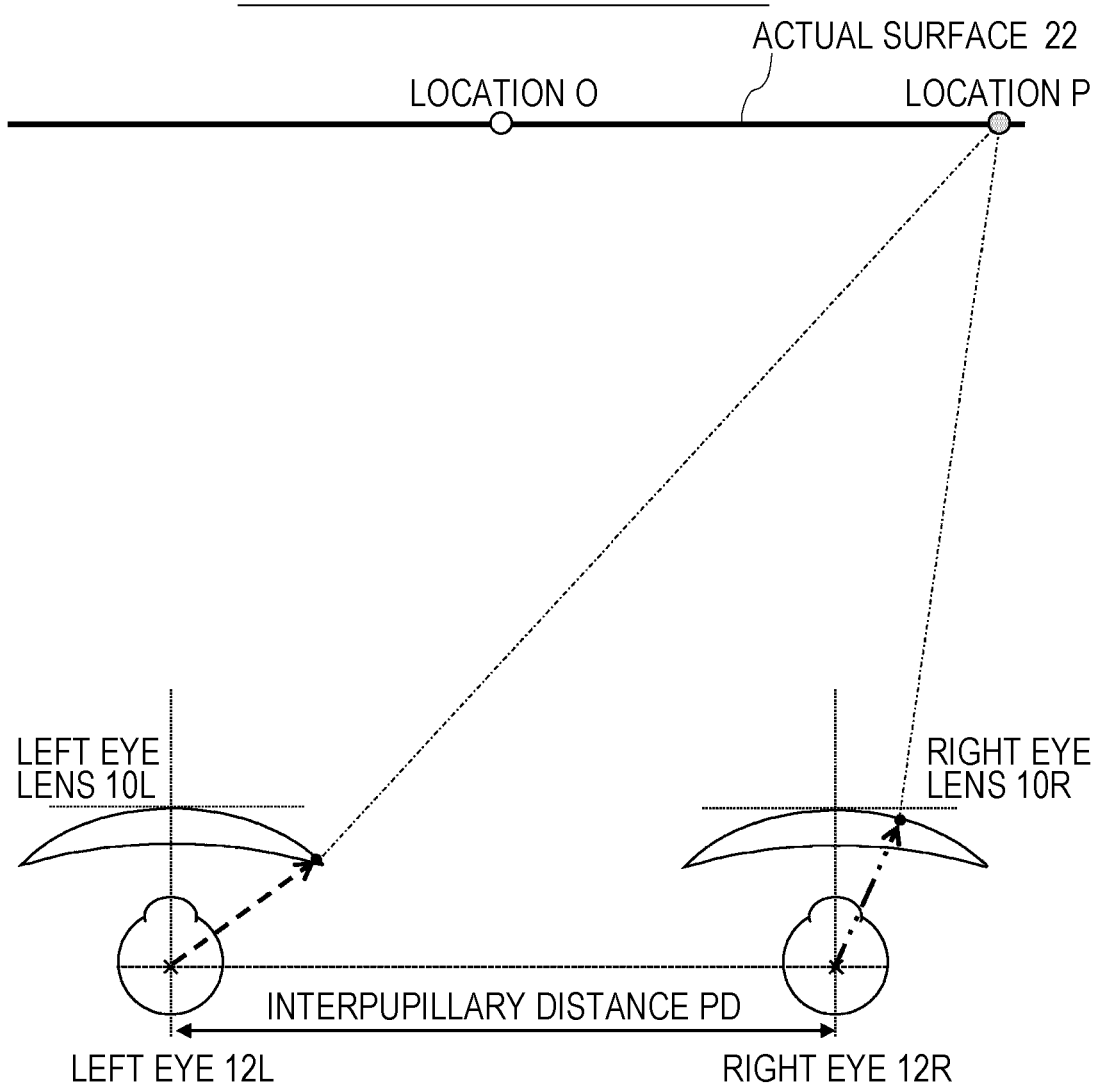
FIG. 4B is a diagram showing a direction of the line of sight of both eyes in a progressive side view state B when the design method of one aspect of the present invention is employed when viewed from the vertically upward direction to the vertically downward direction.

FIG. 4B is a diagram showing a direction of the line of sight of both eyes in a progressive side view state B when the design method of one aspect of the present invention is employed when viewed from the vertically upward direction to the vertically downward direction.

The state B indicates a state when an object at the location P positioned on the side in the horizontal direction of the location O at a constant height in the vertical direction with respect to the location O is visually recognized in a plane that is parallel to the frontal plane and includes the location O. The state B is also referred to as the progressive side view state B. The frontal plane is a plane perpendicular to the medial plane and divides the human body into the ventral and dorsal sides, and is a plane parallel to the horizontal direction.

Then, a difference V between the front view state A and the side view state B at the time the progressive addition lens is worn is obtained.

The difference V and a difference W described later are not particularly limited as long as they are parameters that can express a difference as a state, and include, for example, an eye position difference.

Figure 4C:
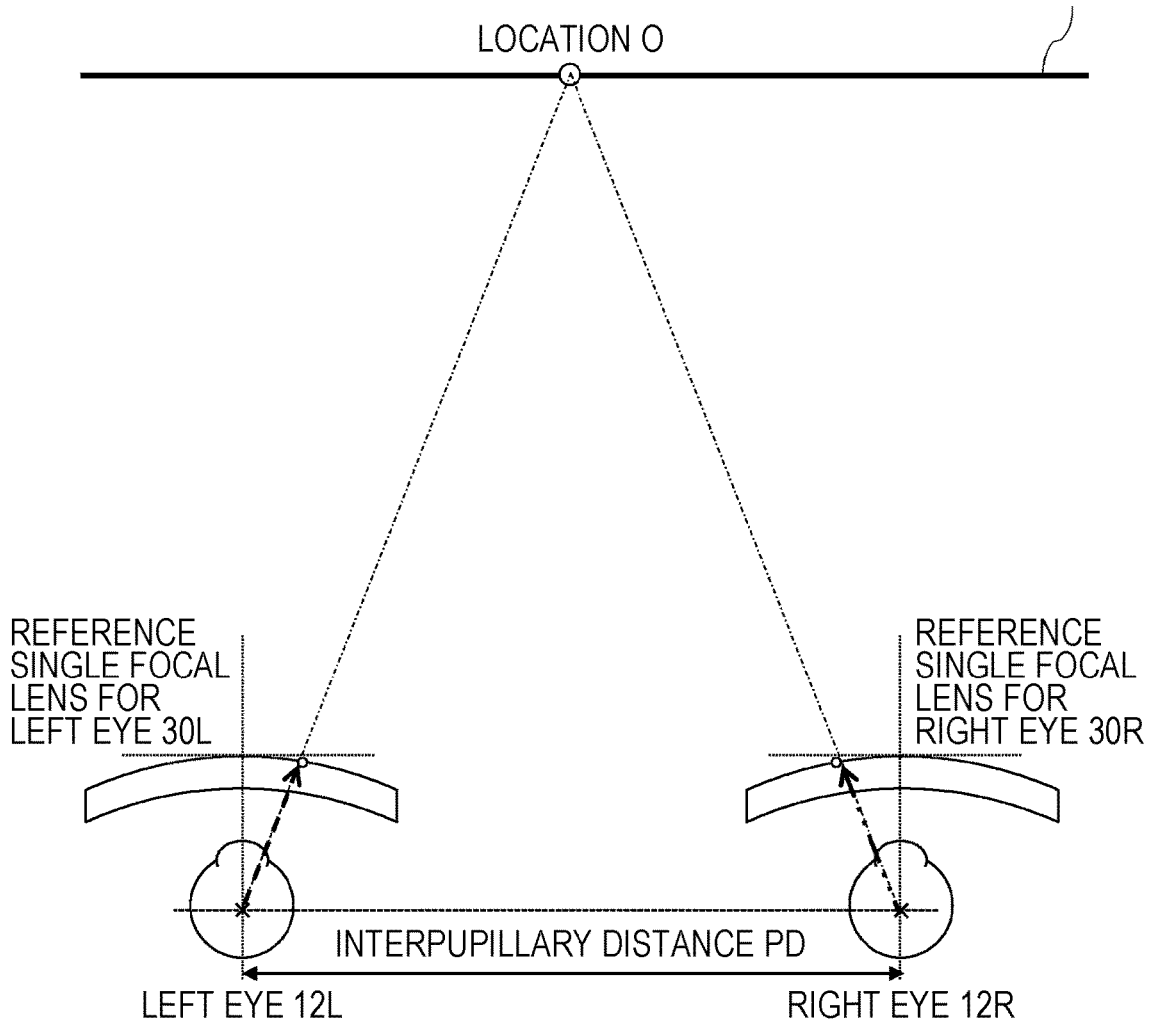
FIG. 4C is a diagram showing a direction of the line of sight of both eyes in a reference front view state C when the design method of one aspect of the present invention is employed when viewed from the vertically upward direction to the vertically downward direction.

FIG. 4C is a diagram showing a direction of the line of sight of both eyes in a reference front view state C when the design method of one aspect of the present invention is employed when viewed from the vertically upward direction to the vertically downward direction.

Figure 4D:
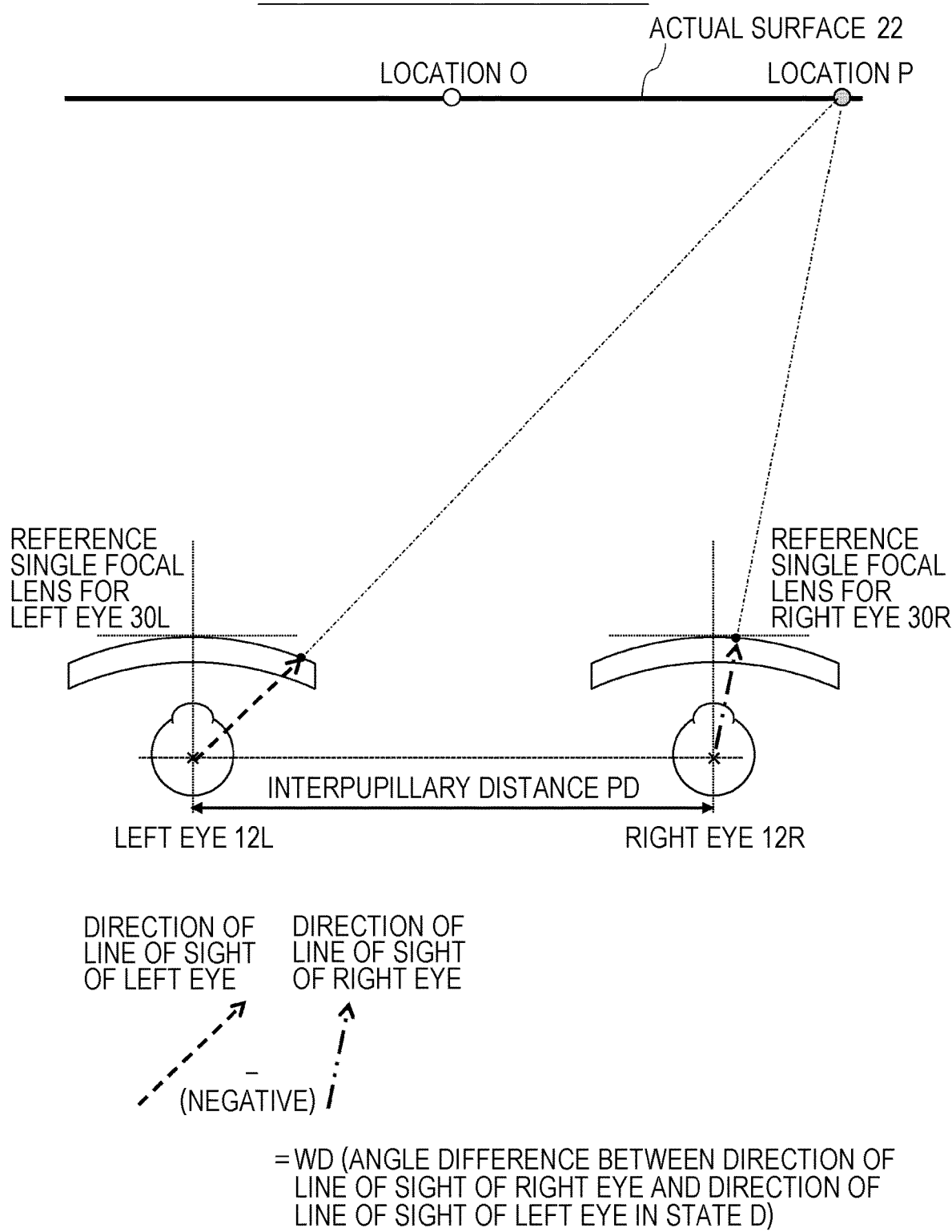
FIG. 4D is a diagram showing a direction of the line of sight of both eyes in a reference side view state D when the design method of one aspect of the present invention is employed when viewed from the vertically upward direction to the vertically downward direction.

FIG. 4D is a diagram showing a direction of the line of sight of both eyes in a reference side view state D when the design method of one aspect of the present invention is employed when viewed from the vertically upward direction to the vertically downward direction.

On the other hand, the state C (reference front view state C) when the object at the location O is visually recognized and the state D (reference side view state D) when the object at the location P is visually recognized at the time a reference single focal lens corresponding to the progressive addition lens is worn or at the time equivalent to the naked eye are grasped.

Regarding the reference single focal lens, a reference single focal lens for the right eye corresponding to the progressive addition lens for the right eye is assumed, and a reference single focal lens for the left eye corresponding to the progressive addition lens for the left eye is assumed. Hereinafter, the above similarly applies to the reference single focal lens. Further, the reference single focal lens may be simply referred to as a reference lens.

The specific configuration of the reference single focal lens is not particularly limited as long as the reference signal focal lens is a lens having basic performance other than a progressive component of the progressive addition lens. Specifically, the lens has the same spherical power S, preferably an equivalent spherical power (S+C/2) considering an astigmatic power C. Hereinafter, in the reference single focal lens, a case where the equivalent spherical power of the progressive addition lens is employed will be illustrated.

Further, the reference single focal lens may be, for example, an aspherical lens for correcting astigmatism or an aspherical lens for reducing off-axis aberration. However, since the reference single focal lens is a reference target (target) when the distortion of the image of an actual surface 22 is suppressed, it is preferable that the distortion of the image be small. For this reason, a spherical lens is preferable as the reference single focal lens. Further, for a similar reason, it is preferable that the prism power Δ be zero as the reference single focal lens. Δ is a unit of prism power, and indicates that when a 1-m ray travels, a 1-cm ray deviates in a direction perpendicular to a ray traveling direction.

Prescription data of wearer information is described in a lens bag of the progressive addition lens. That is, with the lens bag, it is possible to identify the progressive addition lens as an object based on the prescription data of the wearer information. Then, the progressive addition lens is usually set with the lens bag. For this reason, the progressive addition lens to which the lens bag is attached also reflects the technical idea of the present invention, and this similarly applies to the set of the lens bag and the progressive addition lens.

The "at the time equivalent to the naked eye" includes a state of the naked eye, and also includes the time a lens having a spherical power of zero, what is called a zero power lens, is worn.

Then, the difference W between the front view state C and the side view state D at the time the reference single focal lens is worn or at the time equivalent to the naked eye is obtained.

Then, the progressive addition lens is designed so that the difference V at the time the progressive addition lens is worn is brought closer to the difference W at the time the reference single focal lens is worn or at the time equivalent to the naked eye.

There is no particular limitation on the specific design method. For example, the difference V may be brought closer to the difference W by adjusting the prismatic effect by adjusting the gradient of the lens surface while adjusting the curvature of the lens surface within an allowable range. More specifically, the difference V may be brought closer to the difference W by setting a plurality of adjustment points on the lens and changing the prisms in the vertical direction and the horizontal direction at each of the adjustment points.

The region for adjusting the prismatic effect is preferably a region that does not include the main line of sight mainly on the progressive addition lens. The prismatic effect adjustment region preferably includes, for example, a region of a side portion deviating from the main line of sight in the horizontal direction.

Note that the main line of sight refers to a line formed by gathering of portions, through which the line of sight passes, of the spectacle lens. Then, in one aspect of the present invention, for convenience of explanation, the main line of sight in the progressive addition lens is defined as a line connecting a distance power measurement point and a near power measurement point. Further, in practice, this definition can also be applied when a position of the main line of sight of an actual lens is identified.

However, as a matter of course, in one aspect of the present invention, various aspects are created based on the focus on the difference V between the state when an object at the location O in front of the wearer at a finite distance and on the medial plane of the wearer is visually recognized (state A, progressive front view state A described later) at the time the progressive addition lens is worn and the progressive side view state B described above. The focus itself is not limited to the shape of the main line of sight (whether straight or curved). In the first place, considering that the shape of the main line of sight may change depending on the wearer, there is no need to uniquely define the shape and position of the main line of sight itself in configuring the spectacle lens of one aspect of the present invention.

In a case where the side portion deviating from the main line of sight in the horizontal direction is used as the prismatic effect adjustment region, it is possible to adjust the prismatic effect without affecting the spherical power S and the cylindrical power C at the distance reference point given as the prescription information of the progressive addition lens, and the addition power at the near reference point. Further, it is also preferable that a region including the near portion be used as the prismatic effect adjustment region. Further, it is also preferable to set a region that is of a side portion deviating from the main line of sight in the horizontal direction and includes a near portion as the prismatic effect adjustment region.

Figure 6:
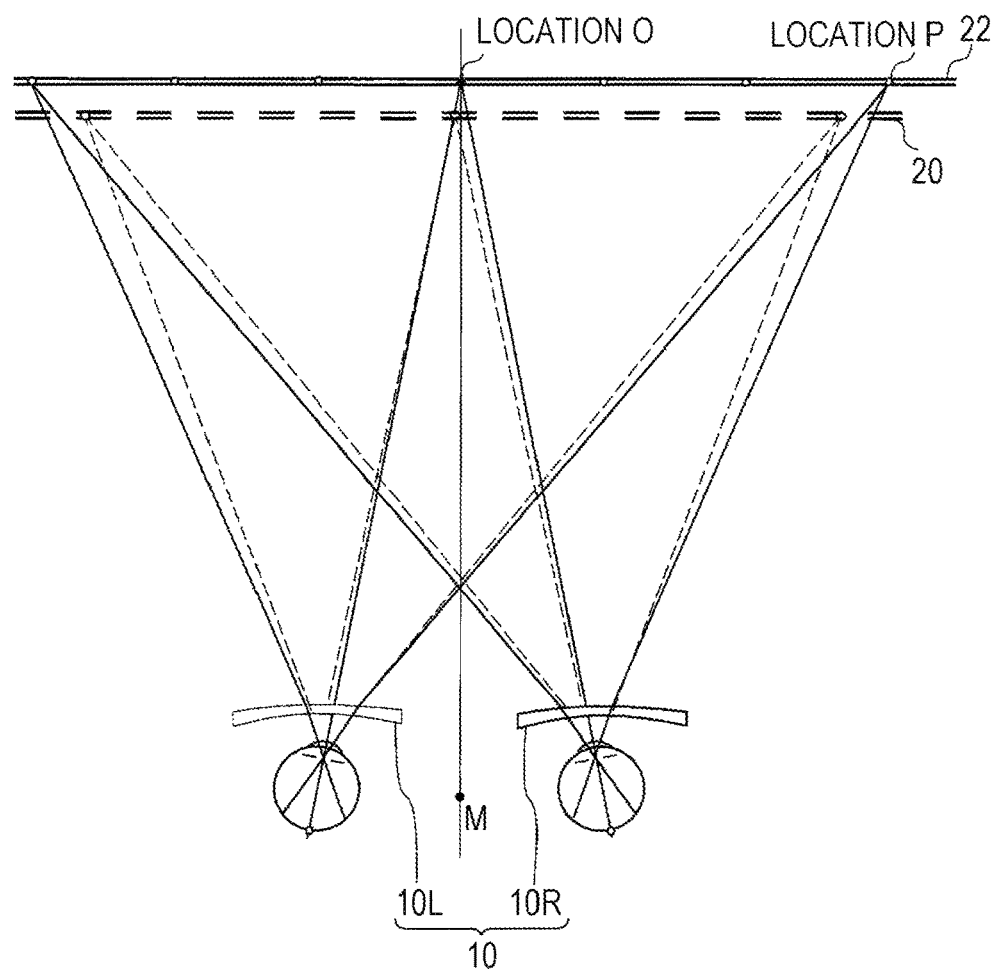
FIG. 6 is a schematic diagram showing a right eye lens and a left eye lens, which are progressive addition lenses after the design method of one aspect of the present invention is employed, and a position of an apparent target object surface for the wearer as seen through the progressive addition lens when viewed from the vertically upward direction to the vertically downward direction.

FIG. 6 is a schematic diagram showing a right eye lens and a left eye lens, which are progressive addition lenses after the design method of one aspect of the present invention is employed, and a position of an apparent target object surface for the wearer as seen through the progressive addition lens when viewed from the vertically upward direction to the vertically downward direction.

Figure 7:
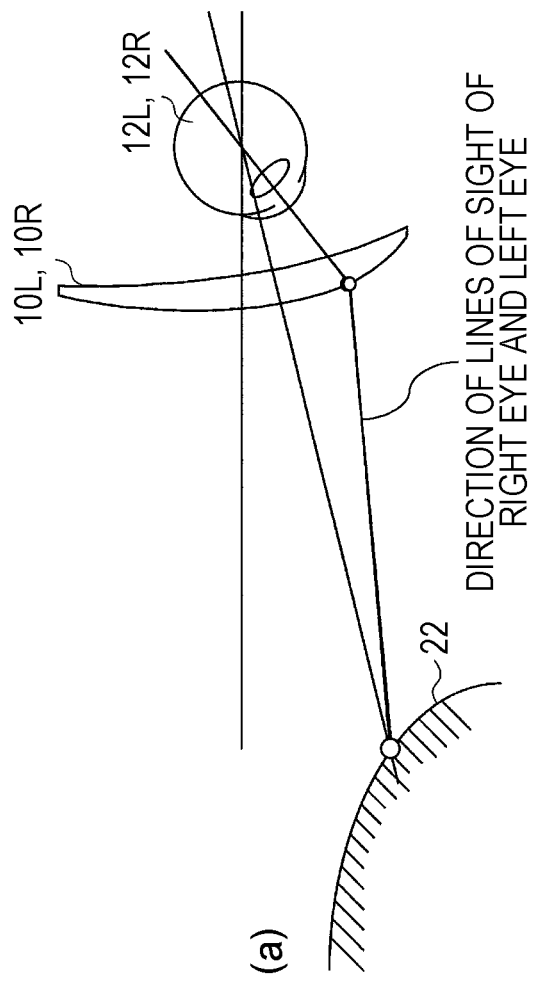
FIG. 7 is a schematic diagram showing a state, in which an eye position difference in the vertical direction is not generated between a right eye and a left eye when an object at a short distance and on the side is looked at through the right eye lens and the left eye lens, which are progressive addition lenses after the design method of one aspect of the present invention is employed, when viewed from the horizontal direction.

FIG. 7 is a schematic diagram showing a state, in which an eye position difference in the vertical direction is not generated between the right eye R and the left eye L when an object at a short distance and on the side is looked at through the right eye lens 10R and the left eye lens 10L, which are progressive addition lenses after the design method of one aspect of the present invention is employed, when viewed from the horizontal direction.

Regarding (distortion in the depth direction) described in the section of the problem, as shown in FIG. 6, a deviation is generated in the depth direction between the actual surface and the apparent surface in the progressive front view state A of looking at the object at the location O. However, as described in the section of the means, in one aspect of the present invention, the convergence angle and the eye position difference between the left and right eyes in the progressive front view state A are accepted. For this reason, this deviation itself is a predicted deviation. On the other hand, in the progressive side view state B, the deviation in the depth direction in the progressive front view state A is maintained. That is, there is no or almost no deviation in the depth direction between the front view and the side view.

Regarding (eye position difference in the vertical direction) described in the section of the problem, as shown in FIG. 7, in a case where the design method according to one aspect of the present invention is employed, the difference V is brought closer to the difference W, so that the eye position difference in the vertical direction in the side view is eliminated or almost eliminated.

As a result, according to one aspect of the present invention, the influence generated by the unnecessary prismatic effect caused by the progressive action is reduced, and a comfortable wearing feeling can be obtained. In particular, a comfortable wearing feeling in the intermediate vision when viewing through the intermediate portion of the progressive addition lens and in near vision when viewing through the near portion can be obtained.

[Details of Design Method of Progressive Addition Lens According to One Aspect of Present Invention]

Hereinafter, a further specific embodiment, preferred embodiment, and variation of one aspect of the present invention will be described.

The difference V is a difference between an angle difference VA between the direction of the line of sight of the right eye and the direction of the line of sight of the left eye in the state A, and an angle difference VB between the direction of the line of sight of the right eye and the direction of the line of sight of the left eye in state B, and the difference W is a difference between an angle difference WC between the direction of the line of sight of the right eye and the direction of the line of sight of the left eye in the state C, and an angle difference WD between the direction of the line of sight of the right eye and the direction of the line of sight of the left eye in the state D.

The angle difference VA, the angle difference VB, the angle difference WC, and the angle difference WD are basically eye position differences obtained by combining the vector components in the horizontal and vertical directions generated by the prismatic effect of the surface shape of the progressive addition lens. On the other hand, a vertical eye position difference may be set by employing only the vector components in the vertical direction of the angle differences VA, VB, VC, and VD. On the contrary, a horizontal eye position difference may be set by employing only the vector component in the horizontal direction.

In view of the viewpoint (eye position difference in the vertical direction) described in the problem, it is preferable that the eye position difference include the eye position difference in the vertical direction. That is, it is preferable to set the eye position difference obtained by combining the vector components in the horizontal direction and the vertical direction, or set the vertical eye position difference by employing only the vector components in the vertical direction of the angle differences VA, VB, VC, and VD.

By using the eye position difference represented by the angle differences VA, VB, VC, and VD as the basis of the difference V and the difference W, solving of (distortion in the depth direction) (eye position difference in the vertical direction) described in the problem can be directly grasped, which is preferable.

Then, the difference V may be included within a predetermined allowable range from the difference W by adjusting the surface shape of the progressive addition lens to change the angle difference VB in the state B.

Note that, in a case where the value of "difference" in the present description is negative, the absolute value is taken as the value of the difference.

The predetermined allowable range may be, for example, 50% or less ($0.5W \leq V \leq 1.5W$) of the difference W, more preferably 40% or less, and further preferably 30% or less. The lower limit is not particularly limited, and is, for example, 5% or 10%.

Assume a case where the time the progressive addition lens is worn is compared with the time the reference single focal lens is worn or the time equivalent to the naked eye, while the eye position difference is used as the basis of the difference V and the difference W.

Note that the direction of the line of sight is, for example, the direction of front view through a right eye lens, a left eye lens, a right eye reference single focal lens, a left eye reference single focal lens, and an integrated eye lens (described later), and can also be expressed by an inclination angle with respect to the Z direction perpendicular to the medial plane and the frontal plane.

As described in the section of the means, the progressive front view state A at the time the progressive addition lens is worn is accepted in one aspect of the present invention even if (distortion in the depth direction) (eye position difference in the vertical direction) are generated. This means that the design of the state A in the progressive addition lens does not have to be changed. As a matter of course, changing the design is not excluded from the present invention.

Further, the reference front view state C and the reference side view state D at the time the reference single focal lens is worn or at the time equivalent to the naked eye are those at the time the reference single focal lens is worn or at the time equivalent to the naked eye, and the design does not need to be changed. As a matter of course, changing the design is not excluded from the present invention.

As a result, if the angle difference VB in the progressive side view state B at the time the progressive addition lens is worn is changed, the difference V can be included within a predetermined allowable range from the difference W, and time and effort for the work can be significantly reduced. As a specific effect, it becomes easy to design so as to satisfy a predetermined addition power ADD. Further, the position in the depth direction at location O is not changed by adjustment of the lens surface shape. For this reason, it is easy to obtain an appropriate lens surface shape.

It is also preferable to assume an integrated eye (cyclops eye) in which the center of rotation is set on the medial plane of the wearer and at an intermediate position between the right eye and the left eye, and a progressive addition lens for the integrated eye.

Figure 8A:
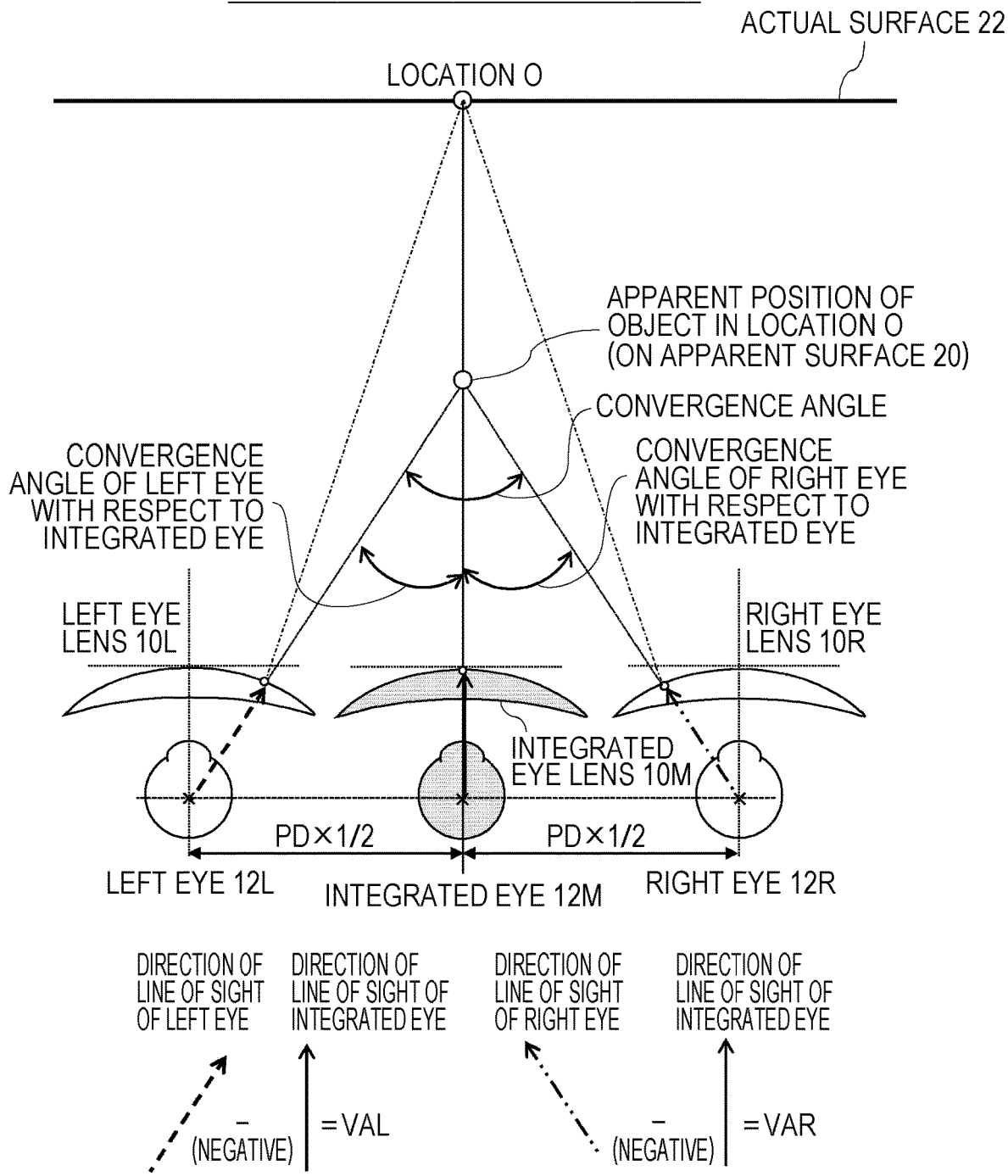
FIG. 8A is a diagram showing a direction of the line of sight of an integrated eye and both eyes in the progressive front view state A as the design method of one aspect of the present invention is employed when viewed from the vertically upward direction to the vertically downward direction.

FIG. 8A is a diagram showing a direction of the line of sight of the integrated eye and both eyes in the progressive front view state A as the design method of one aspect of the present invention is employed when viewed from the vertically upward direction to the vertically downward direction.

Figure 8B:
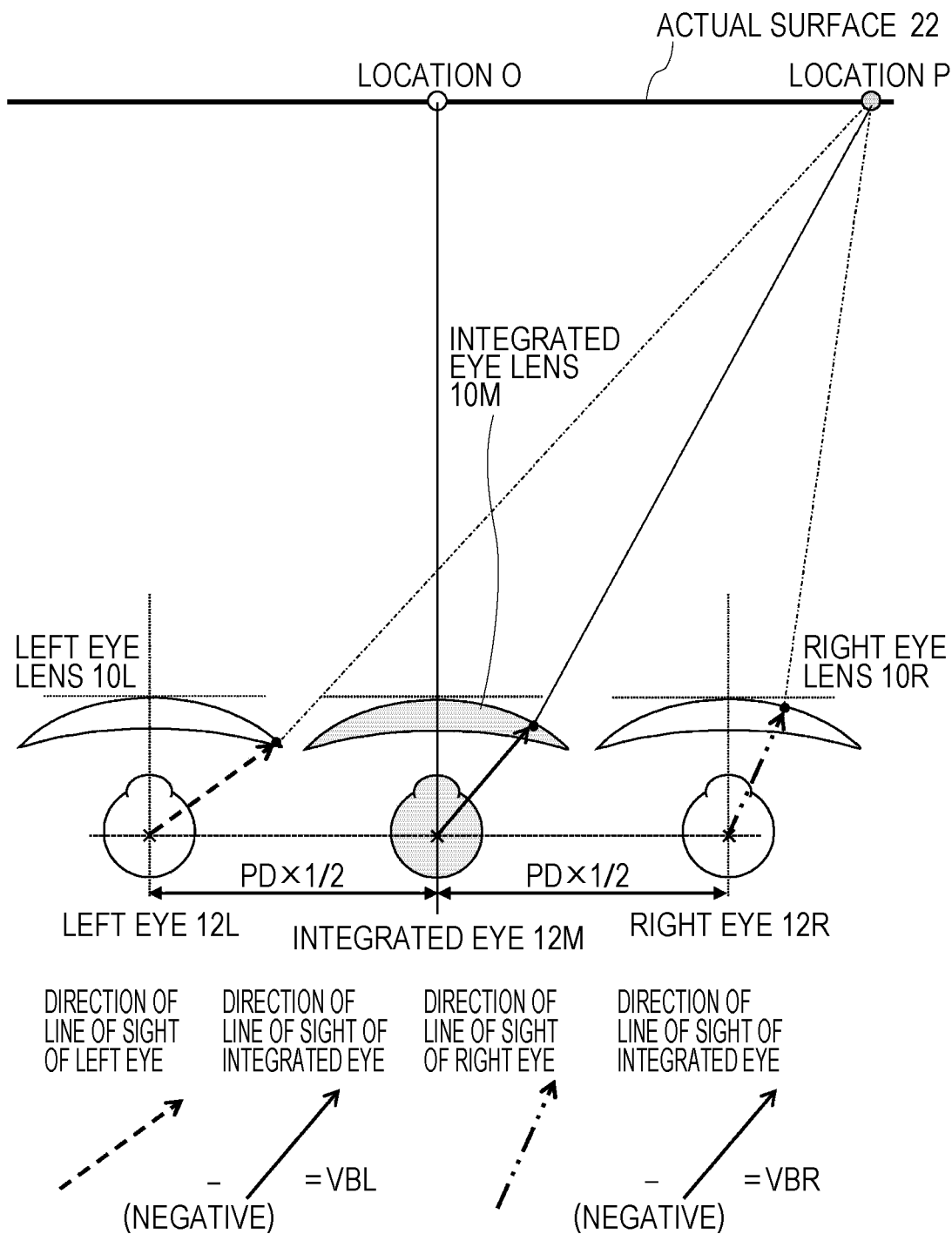
FIG. 8B is a diagram showing a direction of the line of sight of an integrated eye and both eyes in the progressive side view state B as the design method of one aspect of the present invention is employed when viewed from the vertically upward direction to the vertically downward direction.

FIG. 8B is a diagram showing a direction of the line of sight of the integrated eye and both eyes in the progressive side view state B as the design method of one aspect of the present invention is employed when viewed from the vertically upward direction to the vertically downward direction.

Figure 8C:
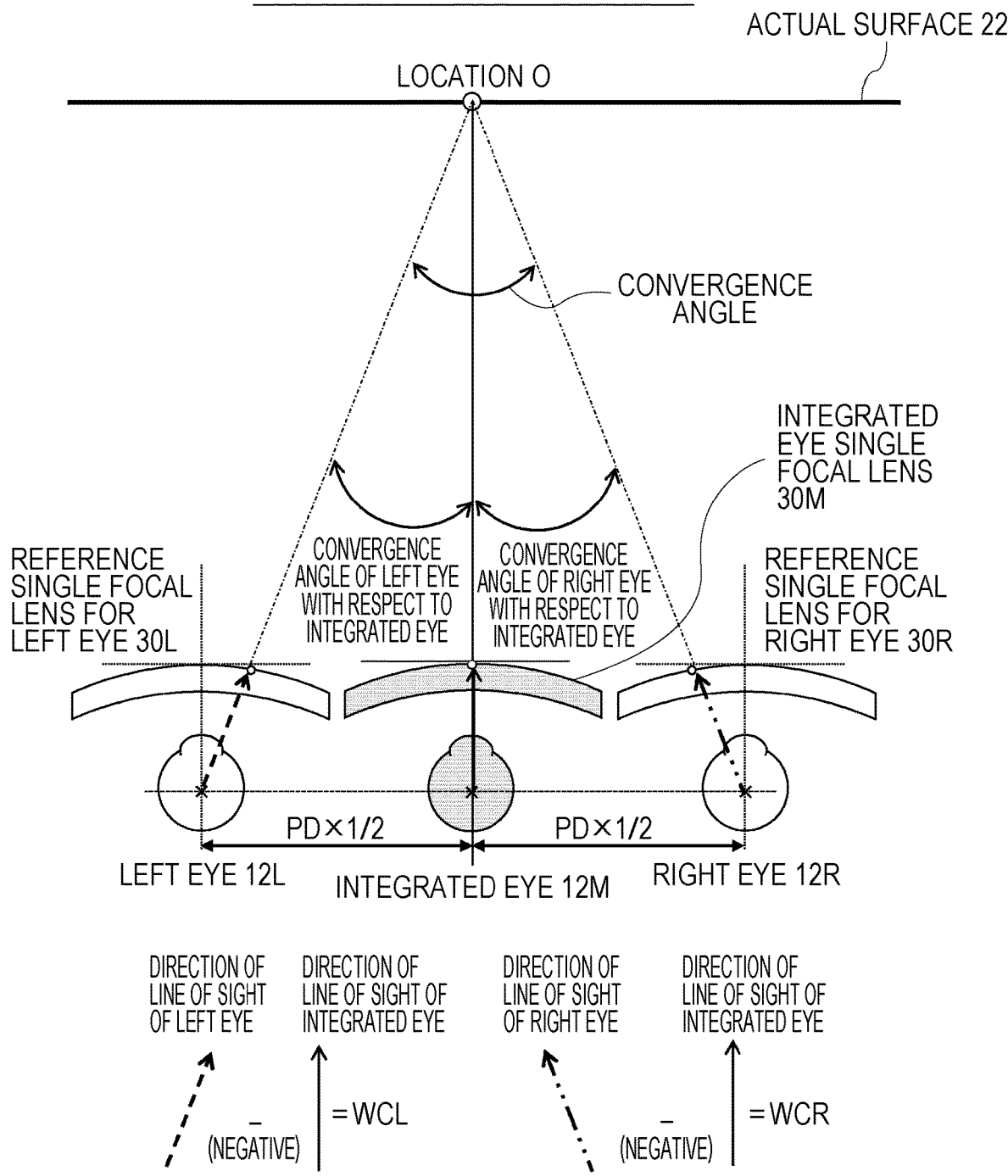
FIG. 8C is a diagram showing a direction of the line of sight of an integrated eye and both eyes in the reference front view state C as the design method of one aspect of the present invention is employed when viewed from the vertically upward direction to the vertically downward direction.

FIG. 8C is a diagram showing a direction of the line of sight of the integrated eye and both eyes in the reference front view state C as the design method of one aspect of the present invention is employed when viewed from the vertically upward direction to the vertically downward direction.

Figure 8D:
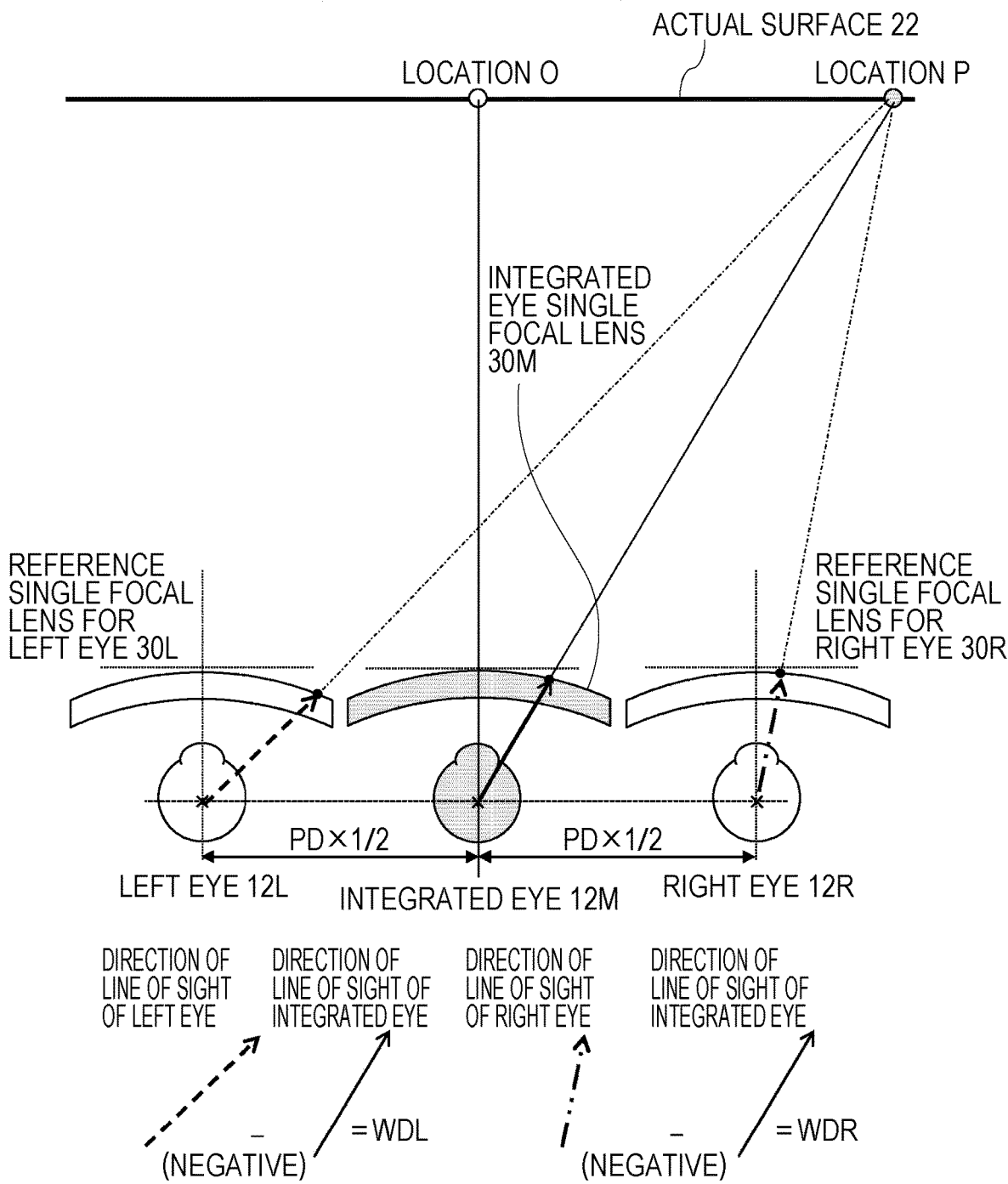
FIG. 8D is a diagram showing a direction of the line of sight of an integrated eye and both eyes in the reference side view state D as the design method of one aspect of the present invention is employed when viewed from the vertically upward direction to the vertically downward direction.

FIG. 8D is a diagram showing a direction of the line of sight of the integrated eye and both eyes in the reference side view state D as the design method of one aspect of the present invention is employed when viewed from the vertically upward direction to the vertically downward direction.

As the optical performance of the progressive addition lens for the integrated eye, in a case where the parameters (spherical power S, astigmatic power C, equivalent spherical power (S+C/2), prism power Δ, addition power ADD, corridor length, inward facing amount, and the like) are the same between the progressive addition lens for the right eye and the progressive addition lens for the left eye, parameters of the same value are preferably employed. In that case, the configuration may be such that only one of the progressive addition lens for the right eye or the progressive addition lens for the left eye is designed, and the progressive addition lens for the other eye is designed so that a distribution diagram of the designed progressive addition lens becomes symmetrical.

For the sake of simplification of the description, this case is employed in the specific example described in the present description, and the equivalent spherical power (S+C/2) is employed. Then, the average value of the equivalent spherical powers of the right eye lens and the left eye lens is employed as a parameter of the integrated eye lens. Further, the astigmatic power C and the prism power Δ are set to zero. This is because it is preferable that distortion of the image be small for the integrated eye lens, like it is preferable to set the astigmatic power C and the prism power Δ of the reference single focal lens to zero.

Note that, in a case where the parameters are different between the right eye lens and the left eye lens, an average value of both may be employed for each parameter. For example, the average value of the equivalent spherical power of the right eye lens and the equivalent spherical power of the left eye lens may be set as the equivalent spherical power of the integrated eye lens.

Note that the determination method for the parameters of the integrated eye single focal lens with respect to the reference single focal lens for the right eye and the reference single focal lens for the left eye may be similar to the determination method for the parameters of the integrated eye lens in the above-mentioned progressive addition lens. For example, the average value of the equivalent spherical power of the reference single focal lens for the right eye and the equivalent spherical power of the reference single focal lens for the left eye may be employed.

Figure 9:
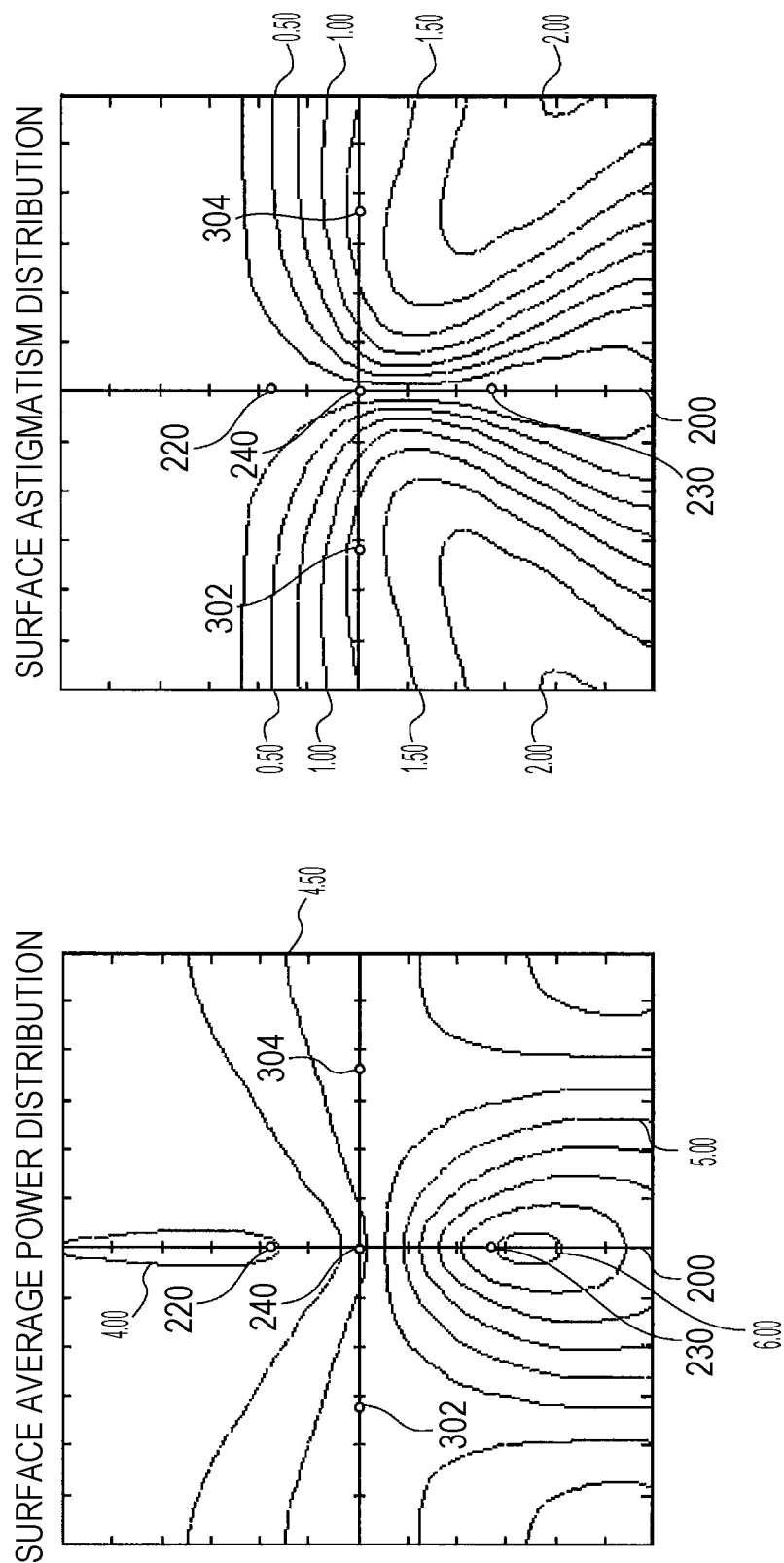
FIG. 9 shows a surface average power distribution diagram (left) and a surface astigmatism distribution diagram (right) showing a basic design of a progressive addition lens for an integrated eye employed in the design method according to one aspect of the present invention.

FIG. 9 shows a surface average power distribution diagram (left) and a surface astigmatism distribution diagram (right) showing a basic design of the integrated eye lens employed in the design method according to one aspect of the present invention.

The origin of each of the distribution diagrams shown in FIG. 9 indicates a spectacle lens center 240, that is, the prism measurement point. The vertical direction on the paper surface indicates the vertical direction of the lens surface, and the horizontal direction on the paper surface indicates the horizontal direction of the lens surface. The distribution diagram is 60-mm square. Contour lines of surface astigmatism and surface average power are drawn at 0.25D [diopter] intervals. The content described in the present paragraph shall apply to a distribution diagram that appears later.

FIG. 9 shows a distance reference point 220 and a near reference point 230. Further, the positions of hidden marks 302 and 304 on the spectacle lens are also shown.

In the surface average power distribution shown in FIG. 9, the spherical power S included in the prescription information is set as the power at the distance reference point 220. As the power of the near reference point 230, the power obtained by adding the addition power ADD described in the prescription information to the spherical power S of the distance reference point 230 is set.

In the present description, the surface average power distribution is distribution of values obtained by multiplying the average value of the maximum curvature and the minimum curvature of the curvatures in each direction at each position of the lens surface by the refractive index of the lens material.

In the present description, the surface astigmatism distribution is distribution of values obtained by multiplying the difference between the maximum curvature and the minimum curvature of the curvatures in each direction at each position of the lens surface by the refractive index of the lens material.

Note that both the distribution diagrams shown in FIG. 9 are diagrams relating to the lens surface. In the surface average power distribution diagram shown in FIG. 9, the surface average power for distance is set to +4.00D, the surface average power for near is set to +6.00D, and the addition power ADD is set to 2.00D, and it is assumed that both the distribution diagrams are reflected on the outer surface which is the surface on the object side. The above similarly applies to an embodiment described below.

However, the specific example of the present description is merely an example, and the inner surface, which is the surface on the eyeball side, may be provided with a shape reflecting the amount distribution diagram, or a double-sided shape may be designed by distributing the progressive component that brings about both the distribution diagrams on both surfaces as progressive surfaces. In that case, the inner surface, which is the surface on the eyeball side, may employ a spherical shape, or may employ an aspherical shape that reduces off-axis aberration and the like.

Many advantages can be obtained by assuming the integrated eye. Hereinafter, the advantages will be described.

Both the right eye lens and the left eye lens are designed in consideration of the inward facing amount. The inward facing amount varies depending on the prescribed spherical power, cylindrical power, addition power, prism power, interpupillary distance, and the like. Further, the main line of sight moves to the nasal side by provision of the inward facing amount. Along with this, the near reference point 230 also moves to one side in the horizontal direction.

On the other hand, for the integrated eye having the center of rotation set at an intermediate position between the right eye and the left eye, it is not necessary to consider the inward facing amount. That is, as shown in FIG. 9, with the integrated eye lens, the main line of sight coincides with the meridian.

Note that the meridian is also a line in the vertical direction passing through the midpoint of the positions of the two hidden marks provided on the progressive addition lens. Further, the meridian is also the Y axis of the distribution diagram.

That is, the average power distribution diagram and the astigmatism distribution diagram of the integrated eye lens are simpler than the distribution diagrams of the right eye lens and the left eye lens.

This is useful when the difference V in the progressive addition lens is brought closer to the difference W in the reference single focal lens or the state equivalent to the naked eye. First, the average power distribution diagram and the astigmatism distribution diagram of the integrated eye lens, which is the basis, are changed. Then, design considering the inward facing amount of the left and right eyes is performed on the progressive addition lenses for the left and right eyes (for example, FIG. 14 described later), and based on the design, whether the difference V is brought closer to the difference W only needs to be examined (first advantage).

This (first advantage) is especially useful in a case of the progressive addition lenses with different prescriptions for the left and right eyes. This is because even in a case where the prescriptions are different for the left and right eyes, the average power distribution diagram and astigmatism distribution diagram of the integrated eye lens used as the basis are first changed, and then design considering the difference in the prescriptions for the left and right eyes only needs to be performed on the progressive addition lenses for the left and right eyes. As compared with performing design change for the progressive addition lenses for the left and right eyes while considering the difference in the prescriptions for the left and right eyes and the inward facing amount from the beginning, the method of one aspect of the present invention reduces time and effort considerably.

Furthermore, since the average power distribution diagram and the astigmatism distribution diagram of the integrated eye lens are used as the basis, there is an advantage that the difference between the integrated eye lens and the right eye lens (for example, eye position difference) can be grasped. Similarly, the difference between the integrated eye lens and the left eye lens can also be grasped (second advantage).

The above configuration can be summarized as described below.

"The angle difference VA is a difference between the angle difference VAR between a direction of the line of sight of the right eye and a direction of the line of sight of the integrated eye and the angle difference VAL between a direction of the line of sight of the left eye and a direction of the line of sight of the integrated eye in the progressive front view state A shown in FIG. 8A, the angle difference VB is a difference between the angle difference VBR between a direction of the line of sight of the right eye and a direction of the line of sight of the integrated eye and the angle difference VBL between a direction of the line of sight of the left eye and a direction of the line of sight of the integrated eye in the progressive side view state B shown in FIG. 8B, the angle difference WC is a difference between the angle difference WCR between a direction of the line of sight of the right eye and a direction of the line of sight of the integrated eye and the angle difference WCL between a direction of the line of sight of the left eye and a direction of the line of sight of the integrated eye in the reference front view state C shown in FIG. 8C, and the angle difference WD is a difference between the angle difference WDR between a direction of the line of sight of the right eye and a direction of the line of sight of the integrated eye and the angle difference WDL between a direction of the line of sight of the left eye and a direction of the line of sight of the integrated eye in the reference side view state D shown in FIG. 8D."

Figure 10:
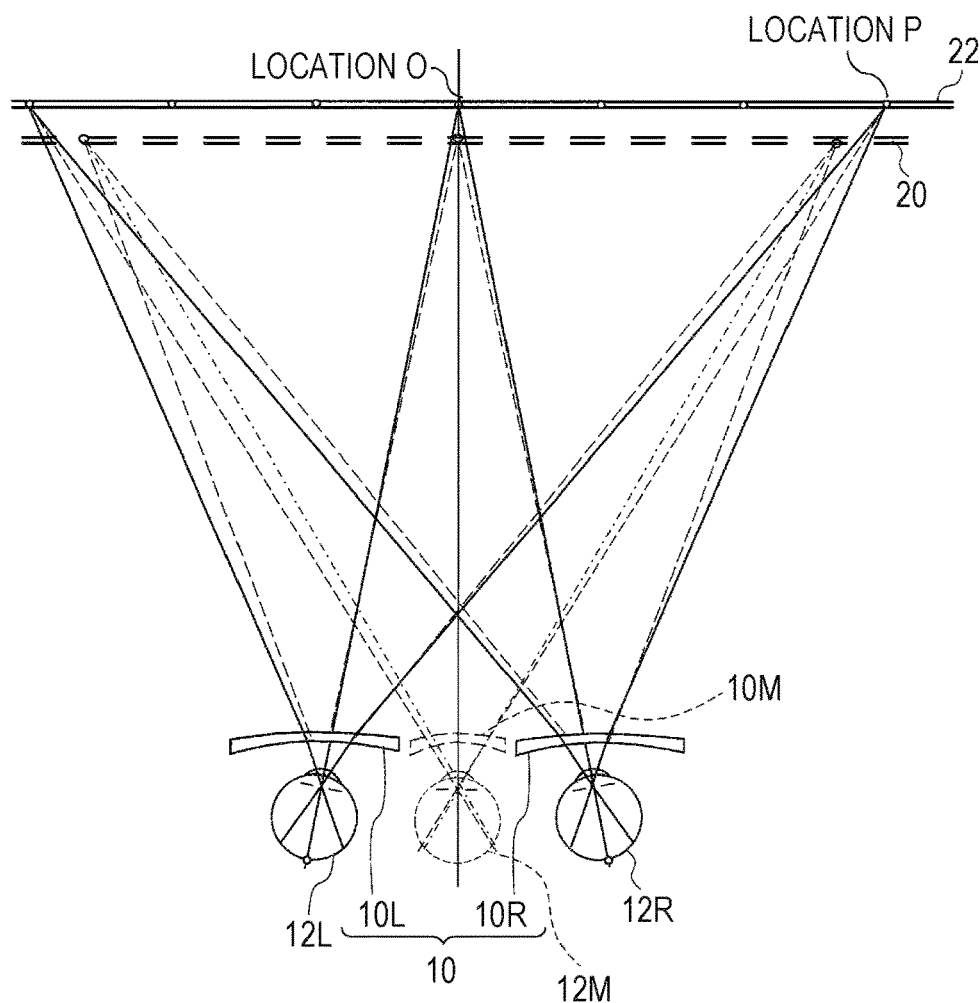
FIG. 10 is a schematic diagram showing a right eye lens, a left eye lens, and an integrated eye lens which are progressive addition lenses after the design method of one aspect of the present invention is employed, and a position of an apparent target object surface for the wearer as seen through the progressive addition lens when viewed from the vertically upward direction to the vertically downward direction.

FIG. 10 is a schematic diagram showing the right eye lens, the left eye lens, and the integrated eye lens which are progressive addition lenses after the design method of one aspect of the present invention is employed, and a position of an apparent target object surface for the wearer as seen through the progressive addition lens when viewed from the vertically upward direction to the vertically downward direction.

Regarding (distortion in the depth direction) described in the section of the problem, also in the case where the integrated eye is employed, there is no or almost no deviation in the depth direction between the front view and the side view as in FIG. 6 of the case where the integrated eye is not employed.

Regarding (eye position difference in the vertical direction) described in the section of the problem, also in the case where the integrated eye is employed, there is no or almost no eye position difference in the vertical direction in the side view as in FIG. 7 of the case where the integrated eye is not employed. The diagram corresponding to FIG. 7 of the case where the integrated eye is employed has the same contents as that of FIG. 7, and is omitted.

Note that, due to (second advantage), the correction amount for the right eye lens and the correction amount for the left eye lens when adjusting the surface shape of the progressive addition lens can be changed according to the difference between the two. A specific example of this configuration is as described below.

"A correction amount for a progressive addition lens for the right eye and a correction amount for a progressive addition lens for the left eye when a surface shape of a progressive addition lens is adjusted are apportioned according to at least any of a ratio of the angle difference VAR to the angle difference VAL, a ratio of the angle difference VBR to the angle difference VBL, a ratio of the angle difference WCR to the angle difference WCL, and a ratio of the angle difference WDR to the angle difference WDL."

Note that in a case of based on the finding that the difference V can be included within a predetermined allowable range from the difference W by changing only the angle difference VB in the progressive side view state B at the time the progressive addition lens is worn, it is preferable to apportion the correction amount according to the ratio of the angle difference VBR and the angle difference VBL among ratios. Further, instead of strictly apportioning the correction amount according to the ratio, some weighting may be applied to apportion the correction amount.

Further, due to (second advantage), for example, one aspect of the present invention can be applied separately to the right eye lens and the left eye lens. An example is as described below.

A difference VR between the angle difference VAR between the direction of the line of sight of the right eye and the direction of the line of sight of the integrated eye in the progressive front view state A shown in FIG. 8A, and the angle difference VBR between the direction of the line of sight of the right eye and the direction of the line of sight of the integrated eye in the progressive side view state B shown in FIG. 8B is obtained.

Similarly, a difference WR between the angle difference WCR between the direction of the line of sight of the right eye and the direction of the line of sight of the integrated eye in the reference front view state C shown in FIG. 8C, and the angle difference WDR between the direction of the line of sight of the right eye and the direction of the line of sight of the integrated eye in the reference side view state D shown in FIG. 8D is obtained.

Then, the progressive addition lens is designed so as to bring the difference VR closer to the difference WR. In this manner, the right eye lens is less affected by the unnecessary prismatic effect caused by the progressive action.

By designing the progressive addition lens for the left eye lens in exactly the same manner, the left eye lens is less affected by the unnecessary prismatic effect caused by the progressive action.

In this method, one aspect of the present invention is applied to each of the right eye lens and the left eye lens based on the angle difference with the integrated eye lens. For this reason, the influence generated by the unnecessary prismatic effect caused by the progressive action can be more strictly reduced. As a result, a more comfortable wearing feeling can be obtained.

[Variation of Design Method of Progressive Addition Lens According to One Aspect of Present Invention]

One aspect of the present invention exemplifies the case where the difference V between the progressive front view state A and the progressive side view state B is grasped, the difference W between the reference front view state C and the reference side view state D is grasped, and the lens surface shape is designed so that the difference V is brought closer to the difference W.

The outline of this case is expressed in a mathematical formula as (A−B)−(C−D). On the other hand, this formula can also be described as (A−C)−(B−D).

That is, the difference V' between the progressive front view state A and the reference front view state C is grasped, the difference W' between the progressive side view state B and the reference front view state D is grasped, and the lens surface shape can be designed so that the difference W' is brought closer to the difference V'. Further, by varying the angle difference VB in the progressive side view state B, it is possible to include the difference W' within a predetermined allowable range from the difference V'. A preferred example of this predetermined allowable range is similar to the range described in [Details of design method of progressive addition lens according to one aspect of present invention].

However, even in a case where this variation is employed, as shown in the above mathematical formula, as a result, the difference V is unchangeably brought closer to the difference W, and the difference V is unchangeably included within a predetermined allowable range from the difference W. That is, this variation is also included in the configurations described in [Design method of progressive addition lens according to one aspect of present invention] and [Details of design method of progressive addition lens according to one aspect of present invention].

Note that, as in one aspect of the present invention, a combination of the difference V between the progressive front view state A and the progressive side view state B and the difference W between the reference front view state C and the reference side view state D is employed, so that only the reference single focal lens is reflected to the difference W. That is, only the value as a target to be aimed at is reflected to the difference W. By bringing the difference V, to which only the progressive addition lens is reflected, closer to the difference W, the advantage of the present invention can be achieved. For this reason, it is preferable to employ the difference V and the difference W.

Note that the formula can also be described as (A+D)−(B+C). However, in view of the point that only the value as the target to be aimed at is reflected to the difference W, the consideration is preferably made based on (A−B)−(C−D).

[Specific Example (System) of Design Method of Progressive Addition Lens According to One Aspect of Present Invention]

Hereinafter, a specific example in which the above-mentioned design method of the progressive addition lens is applied to a system will be described. In the present example, a case where an integrated eye is employed will be illustrated. Note that the content that overlaps with the content described so far will be omitted. Further, in the present example, since the case of designing the right eye lens and the left eye lens is illustrated, both the lenses may be collectively referred to as a lens pair for convenience of explanation. Further, the reference single focal lens may be referred to as a reference lens, and the integrated eye lens may be referred to as an integrated lens.

Figure 11:
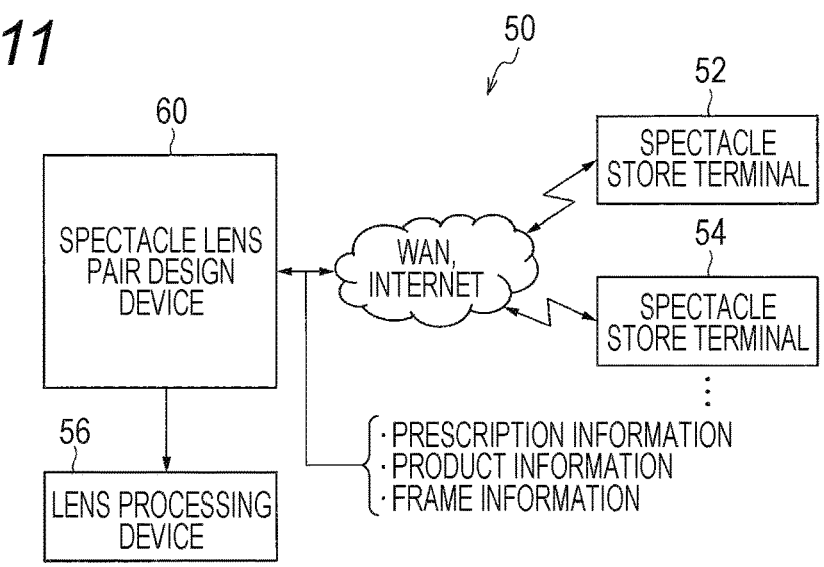
FIG. 11 is a diagram explaining an example of a system that implements the design method of a progressive addition lens according to one aspect of the present invention.

FIG. 11 is a diagram explaining an example of a system that implements the design method of a progressive addition lens according to one aspect of the present invention.

A system 50 shown in FIG. 11 includes a plurality of spectacle store terminals and a spectacle lens pair design device (hereinafter, also referred to as a design device or a computer device) 60 for a progressive addition lens which is a spectacle lens. Note that the configuration below is controlled by a control unit (not shown).

As the spectacle store terminal, FIG. 11 exemplifies a spectacle store terminal 52 and a spectacle store terminal 54. In the example shown in FIG. 11, the spectacle store terminals 52 and 54 are connected to the design device 60 via a wide area network (WAN) or the Internet. The design device 60 is connected to a lens processing device 56, and the design information of the progressive addition lens designed by the design device 60 is sent to the lens processing device 56. In the lens processing device 56, a progressive addition lens is manufactured by processing performed on the lens surface based on the design information.

The spectacle store terminal 52 receives input of information for manufacturing a progressive addition lens for a customer, and sends the information to the design device 60 via the WAN or the Internet. The design device 60 designs the progressive addition lens 10 using the transmitted information.

Information for manufacturing the progressive addition lens 10 includes at least prescription information on the eye of the wearer who plans to wear the progressive addition lens 10, product information on the progressive addition lens, and frame information for mounting the progressive addition lens.

The prescription information includes information of, for example, the spherical power (also referred to as average power) S at the distance reference point of the right eye lens 10R and left eye lens 10L, the cylindrical power C at the distance reference point, an astigmatism axis Ax, the addition power ADD in the progressive addition lens, prism power and basal direction, an interpupillary distance PD, a physiological characteristic amount related to the visual perception of the wearer, a visual environment, and the like.

The product information includes information on the design type relating to the lens, information on the corridor length, information on the lens diameter, information on the lens thickness, and the like. The design type is, for example, in the case of a progressive addition lens, information of whether the lens emphasizes distance vision or a lens that emphasizes near vision, is a lens that is hard designed, is a lens that is soft designed, and the like.

The frame information includes various information such as the shape, size, frame material, eye point position, frame forward tilt angle, frame warp angle, and distance between vertices of the frame lens shape.

Figure 12:
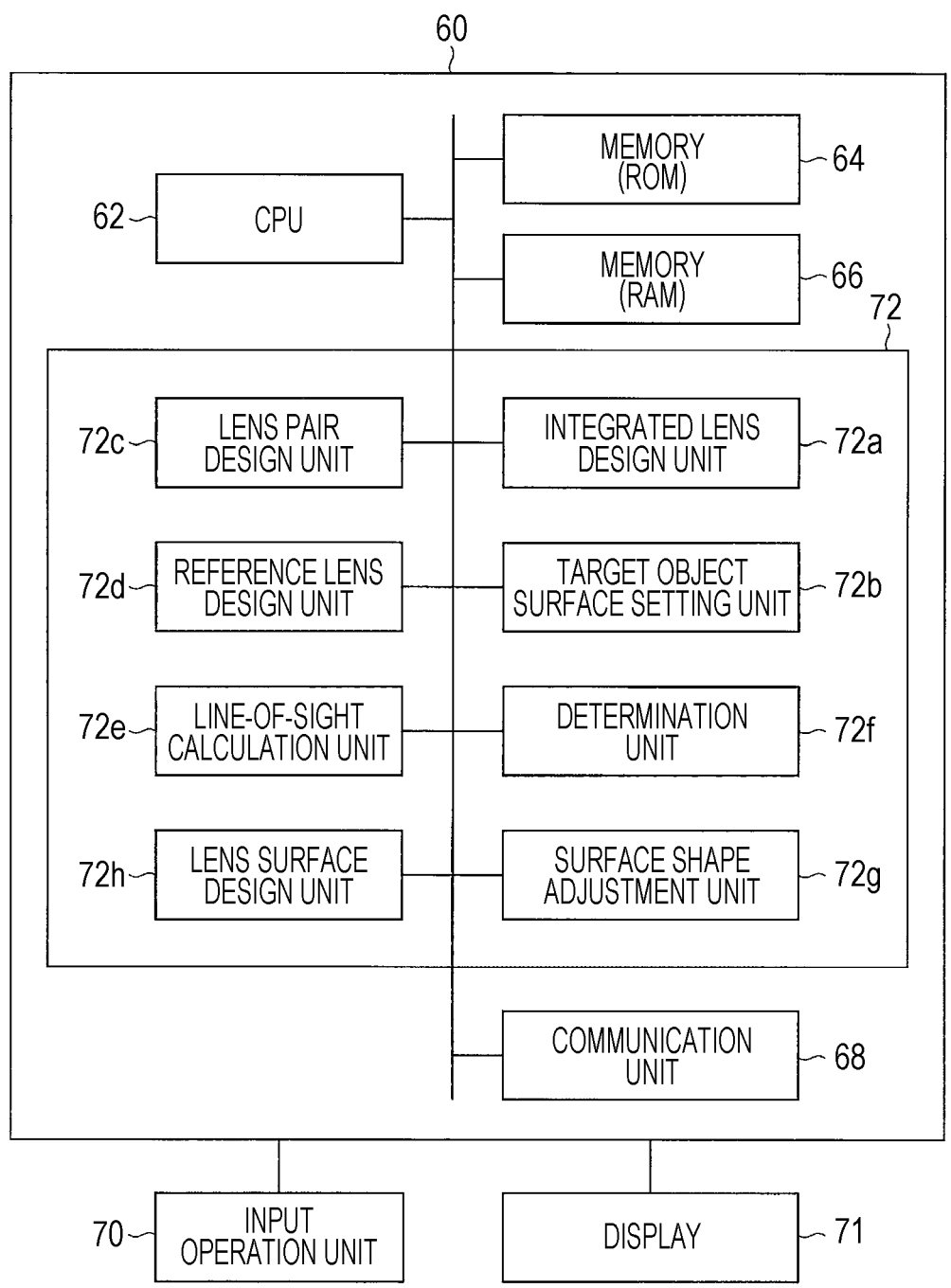
FIG. 12 is a configuration diagram showing a device configuration of a design device in the system that implements the design method of a progressive addition lens according to one aspect of the present invention.

FIG. 12 is a configuration diagram showing a device configuration of the design device in the system that implements the design method of a progressive addition lens according to one aspect of the present invention.

The design device 60 is composed of a computer including a CPU 62, a ROM 64, a RAM 66, and a communication unit 68. The communication unit 68 is connected to the spectacle store terminals 52 and 54 via WAN or the Internet.

That is, the computer executes the manufacturing method of the progressive addition lens as the design device 60. The design device 60 is connected to an input operation unit 70 such as a mouse or a keyboard and a display 71. According to the input screen displayed on the display 71, the operator inputs parameters and information via the input operation unit 70, so that design described later can be executed.

The design device 60 calls a program stored in the ROM 64 and the CPU 62 executes the program to form and activate a software module 72.

The software module 72 includes an integrated lens design unit 72a, a target object surface setting unit 72b, a lens pair design unit 72c, a reference lens design unit 72d, a line-of-sight calculation unit 72e, a determination unit 72f, a surface shape adjustment unit 72g, and a lens surface design unit 72h.

The integrated lens design unit 72a designs an integrated eye 12M and an integrated eye lens 10M shown in FIG. 10 and creates the surface average power distribution and the surface astigmatism distribution of the integrated eye lens 10M shown in FIG. 9.

The target object surface setting unit 72b is a part that determines a finite distance when the wearer gazes at the target object surface 22 (actual surface 22) away from the progressive addition lens 10 by the finite distance, and sets the actual surface 22.

The lens pair design unit 72c is a part that performs initial design of the right eye lens and the left eye lens based on the above-mentioned prescription information. As an example, the initial design is a lens surface shape determined based on the prescription information.

The reference lens design unit 72d designs a reference single focal lens. In the present example, a case of designing a reference point single focal lens that is a single focal lens and employs the same equivalent spherical power (S+C/2) as a progressive addition lens is illustrated.

Note that also in a case where a lens having zero spherical power, what is called a zero power lens, is used instead of the reference single focal lens, the reference lens design unit 72d may be used. Further, in a case where the state of the naked eye is employed, the reference lens design unit 72d does not need to be used. As a matter of course, even in a case where the state of the naked eye is employed, the other units for obtaining the difference W are used.

The line-of-sight calculation unit 72e is a part that calculates the direction of the line of sight of a right eye 12R and the direction of the line of sight of a left eye 12L when gazing at the location O (FIGS. 8A and 8C) and the location P (FIGS. 8B and 8D) on the side of the location O on the actual surface 22 through the right eye lens and the left eye lens which are the progressive addition lens initially designed.

The line-of-sight calculation unit 72e also calculates the direction of the line of sight of the integrated eye 12M when gazing at the location O and the location P on the side of the location O on the actual surface 22 through the integrated eye 12M and the integrated eye lens 10M shown in FIG. 10.

The line-of-sight calculation unit 72e also calculates the direction of the line of sight of the right eye 12R and the direction of the line of sight of the left eye 12L when gazing at the location O and the location P on the side of the location O on the actual surface 22 through the reference single focal lenses for the right eye and the left eye.

The determination unit 72f determines whether or not the difference V is brought closer to the difference W. For example, the determination unit 72f determines whether or not the difference V is within a predetermined allowable range from the difference W.

The surface shape adjustment unit 72g adjusts the lens surface shapes of the initially designed right eye lens and left eye lens in a case where the determination unit 72f issues a determination result of NG.

In this way, the design device 60 adjusts the lens surface shape by using the surface shape adjustment unit 72g and the line-of-sight calculation unit 72e until the determination unit 72f issues a determination result of OK.

The lens surface design unit 72h specifically performs surface design of the lens surfaces on both sides by using the lens surface shape for which the determination unit 72f issues a determination result of OK.

Note that whether to design an inner surface progressive addition lens that includes a progressive component with addition power added to the lens surface on the eyeball side, an outer surface progressive addition lens that includes a progressive component with addition power added to the lens surface on the opposite side of the eyeball side, or a double-sided progressive addition lens in which a progressive component is distributed on both the lens surface on the eyeball side and the lens surface on the opposite side to the eyeball side can be appropriately selected.

Figure 13:
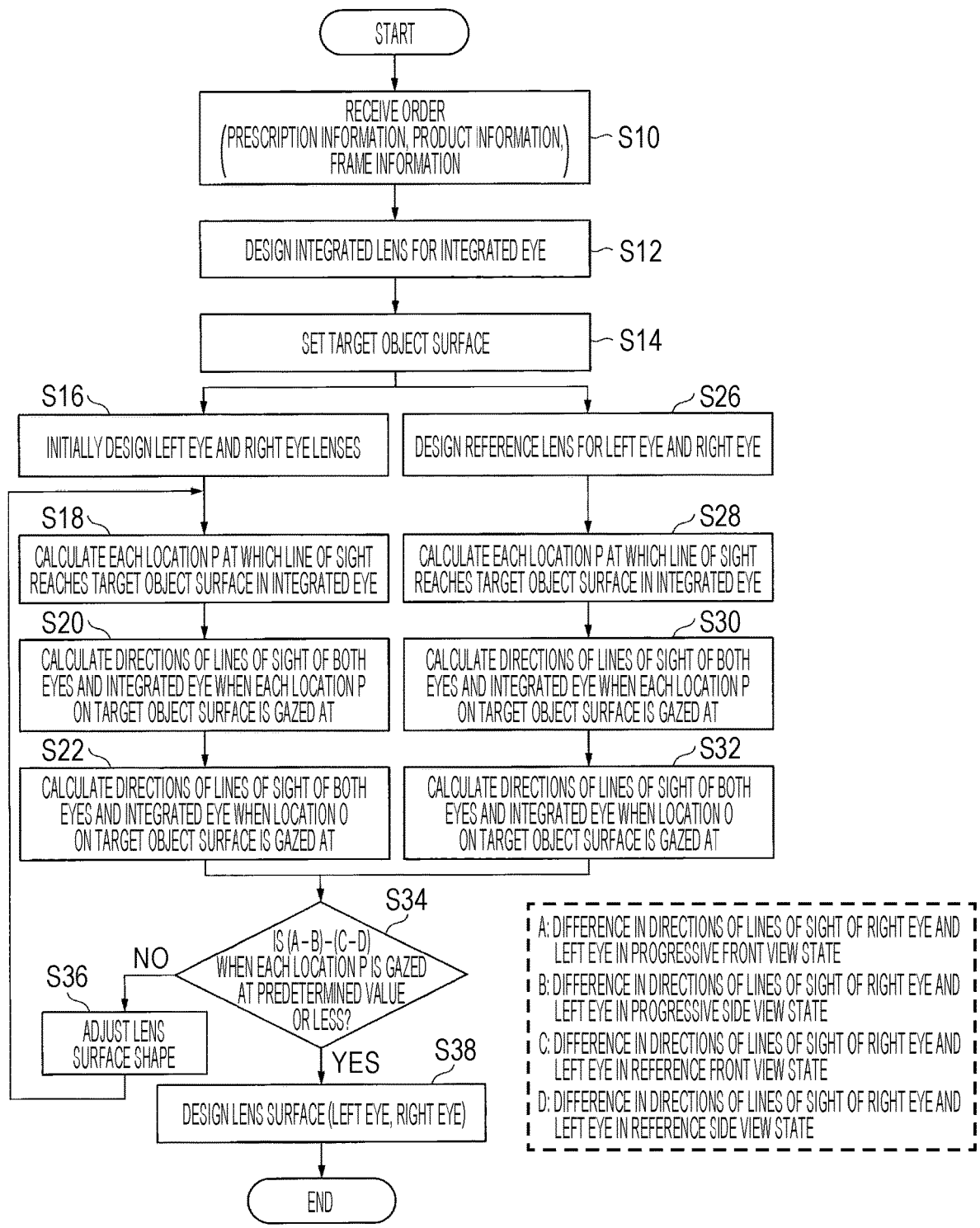
FIG. 13 is a diagram showing a process of the design method of a progressive addition lens according to one aspect of the present invention.

FIG. 13 is a diagram showing a process of the design method of a progressive addition lens according to one aspect of the present invention.

First, the design device 60 receives an order for manufacturing the progressive addition lens 10 from the spectacle store terminals 52, 54, and the like (step S10). This order includes the prescription information, product information, and frame information for the wearer ordering the progressive addition lens 10.

The integrated lens design unit 72a assumes the integrated eye 12M by using the prescription information included in the received order and further using the product information. Then, as shown in FIG. 9, the integrated eye lens 10M for the integrated eye 12M is designed (step S12).

Next, the target object surface setting unit 72b determines a finite distance and sets the target object surface 22 (actual surface 22) (step S14).

Figure 14:
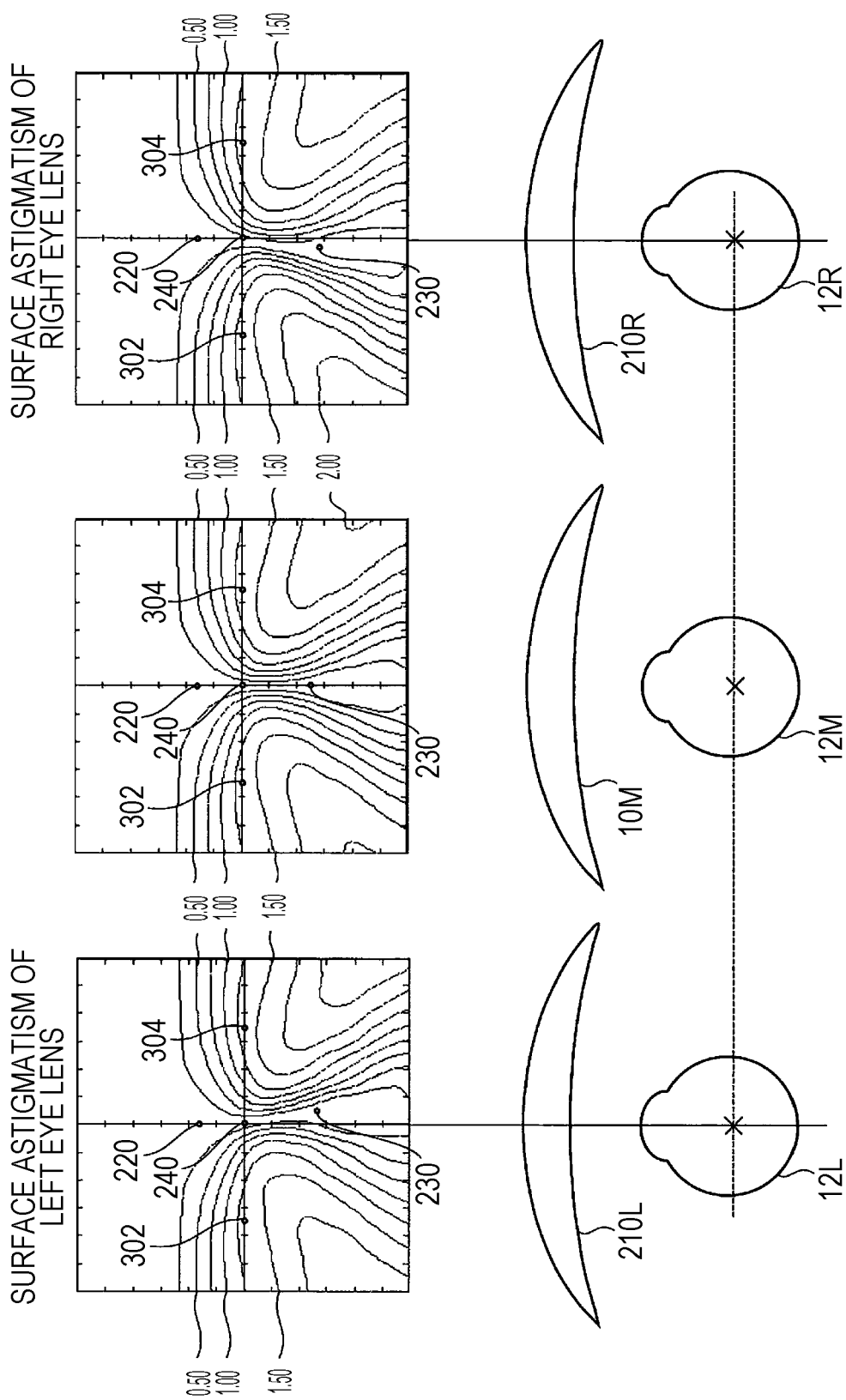
FIG. 14 is a diagram showing an example of surface astigmatism distribution of the right eye lens and the left eye lens initially designed while inward facing is performed with respect to surface astigmatism distribution of the integrated eye lens.

FIG. 14 is a diagram showing an example of surface astigmatism distribution of the right eye lens 210R and the left eye lens 210L initially designed while inward facing is performed with respect to surface astigmatism distribution of the integrated eye lens.

Next, the lens pair design unit 72c performs the initial design of the progressive addition lenses for the right eye and the left eye (step S16). Further, as shown in FIG. 14, the lens pair design unit 72c performs inward facing for the integrated eye lens 10M to create surface average power distribution and surface astigmatism distribution.

If necessary, the lens pair design unit 72c adds modification to the surface average power distribution and surface astigmatism distribution of the right and left eye lenses initially designed according to the cylindrical power C and addition power ADD of the right and left eyes, and determines a lens surface shape that realizes this correction result.

Next, when the line-of-sight calculation unit 72e calculates the location P on the actual surface 22 to which the line of sight of the integrated eye 12M reaches when the integrated eye 12M looks at, through the integrated eye lens 10M, a portion corresponding to a predetermined distance (for example, 40 cm) from the wearer on the actual surface 22 (step S18). Note that position coordinates of the location O can be grasped in a stage where the predetermined distance is set to 40 cm. To mention again, the location P is a location that is positioned on the horizontal side of the location O at a constant height in the vertical direction with respect to the location O.

Specifically, as a calculation method for the location P, the direction of the line of sight of the integrated eye 12M is changed by giving an inclination angle θ to the Z direction (depth direction) of the front view, and the position coordinates of the location P on the actual surface 22 to which the line of sight reaches at this time is calculated.

Note that, by changing the inclination angle 19, it is possible to calculate a plurality of the locations P in the horizontal direction in a portion corresponding to a predetermined distance of 40 cm from the wearer on the target object surface 20 in FIG. 5 (for example, locations P1, P2, P3, . . . , collectively expressed as P). At each of the calculated locations P, calculation of the direction of the line of sight of the right eye, the left eye, and the integrated eye, which will be described later, is performed.

At this time, the line of sight is refracted by the prismatic effect of the integrated eye lens 10M. This refraction amount changes depending on which part of the integrated eye lens 10M the line of sight passes through. The inclination angle of the line of sight of the integrated eye with respect to the Z direction and the position coordinates of the location P are stored in the RAM 66.

Next, the line-of-sight calculation unit 72e calculates, by a method similar to that for the direction of the line of sight in the integrated eye lens, the direction of the line of sight on the eyeball side of the right eye 12R and the left eye 12L when the right eye 12R and the left eye 12L gaze at each of the locations P on the actual surface 22 through the right eye lens 210R and left eye lens 210L initially designed (step S20). Then, the inclination angle of the line of sight of the right eye 12R and the left eye 12L with respect to the Z direction and the position coordinates of the location P are stored in the RAM 66.

Next, the line-of-sight calculation unit 72e calculates the direction of the line of sight of the right eye 12R, the left eye 12L, and the integrated eye when gazing at the location O on the medial plane by a method to that for the direction of the line of sight with respect to the location P (step S22). The inclination angle of the line of sight of the right eye 12R, the left eye 12L, and the integrated eye with respect to the Z direction are stored in the RAM 66.

On the other hand, the reference lens design unit 72d designs a reference single focal lens for the right eye and a reference single focal lens for the left eye (step S26). This step may be performed while steps S16 to 24 are executed in the design device 60, before steps S16 to 24 are executed, or after steps S16 to 24 are executed.

Next, the line-of-sight calculation unit 72e calculates the location P where the line of sight of the integrated eye 12M reaches the actual surface 22 when the integrated eye 12M looks at the actual surface 22 through an integrated eye single focal lens 30M (step S28). Since this step is the same as step S18 described above, this processing may be omitted. Step S28, which performs the same processing as step S18, will be omitted from the description.

Furthermore, the line-of-sight calculation unit 72e calculates the direction of the line of sight that is of when a point on the actual surface 22 is gazed at through the reference single focal lens, and of the right eye 12R, the left eye 12L, and the integrated eye 12M corresponding to each of the locations P on the actual surface 22 (step S30).

Furthermore, the line-of-sight calculation unit 72e calculates the direction of the line of sight of the right eye 12R and the left eye 12L when the location O on the actual surface 22 is gazed at through the reference single focal lenses 30L and 30R (step S32). Specifically, the line-of-sight calculation unit 72e calculates the inclination angle of the line of sight of the left eye 12L and the right eye 12R with respect to the Z direction. The position coordinates of the location O and the calculated inclination angle of the line of sight of the left eye 12L and the right eye 12R are stored in the RAM 66.

Note that the order of steps S16 to S22 and steps S26 to 32 is not particularly limited. Further, step S16 may be followed by step S26, then step 18, and then step S28, step S20, step S30, and so on in an alternate manner. Further, the order of processing in steps S14 and steps S16 and 26 may be replaced with each other.

The determination unit 72f calls the stored inclination angle indicating the direction of each line of sight and the position coordinates of the location O from the RAM 66, calculates the difference in the directions of the line of sight, and makes determination (step S34). This determination is made for each of the locations P.

Further, the predetermined distance may be changed from 40 cm, and similar operation may be performed to grasp the location O, calculate each of the locations P, and calculate the direction of the line of sight of the right eye, the left eye, and the integrated eye. In that case, the determination unit 72f also makes determination for each of the locations P in a case where the predetermined distance is changed from 40 cm.

In a case where the determination unit 72f issues a determination result of NG, the surface shape adjustment unit 72g adjusts the lens surface shapes of the initially designed left eye lens 210L and right eye lens 210R (step S36).

In a case where the determination unit 72f issues a determination result of OK for all the locations P, the adjusted lens surface shape is determined to be the lens surface shape used for the final progressive addition lens 10.

Figure 15:
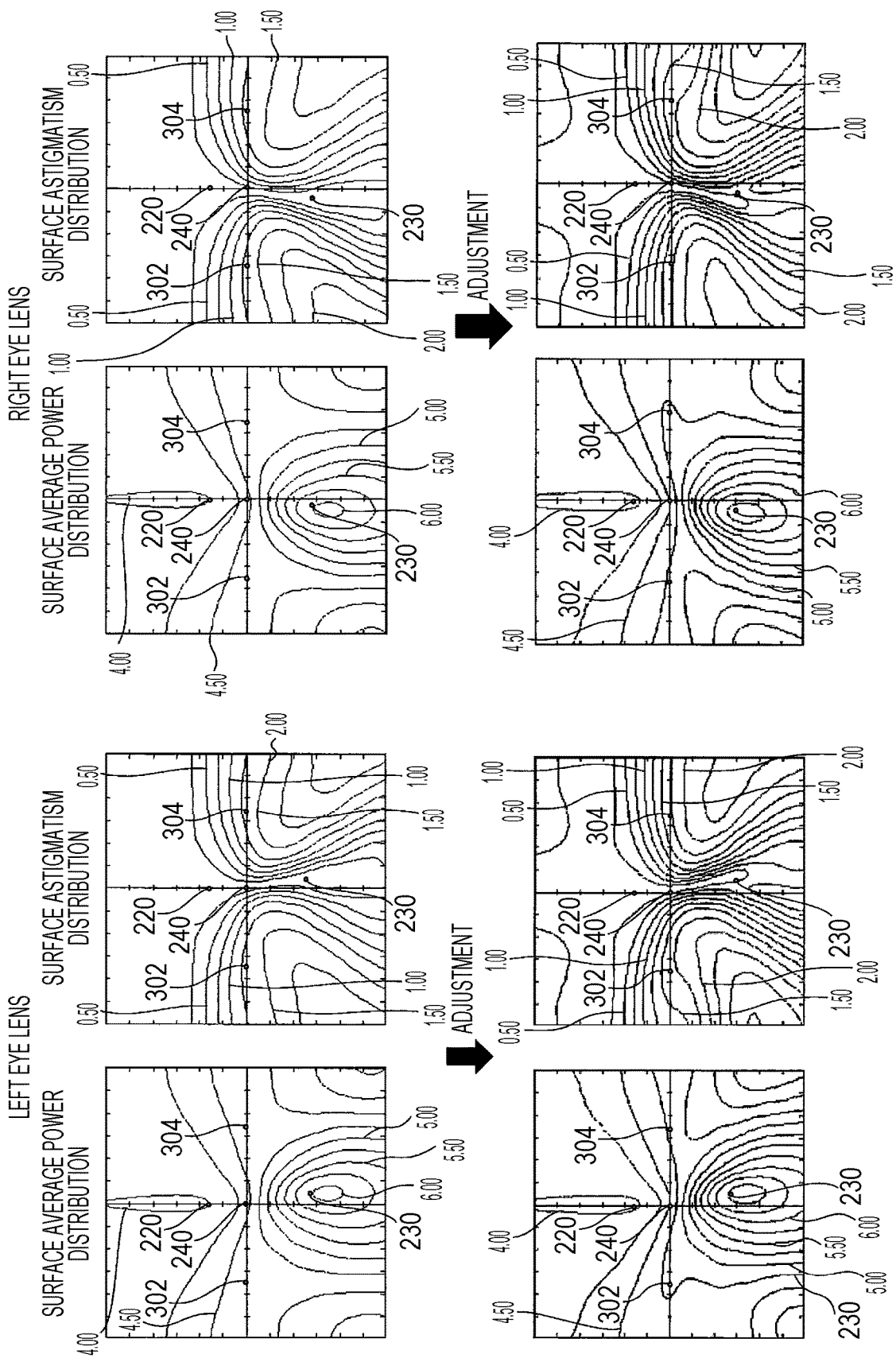
FIG. 15 is a diagram showing an example of a change in the surface average power distribution and the surface astigmatism distribution on a lens surface before and after adjustment when the left eye lens and the right eye lens are progressive addition lenses.

FIG. 15 is a diagram showing an example of a change in the surface average power distribution and the surface astigmatism distribution on a lens surface before and after adjustment when the left eye lens 210L and the right eye lens 210R are progressive addition lenses.

Finally, the lens surface design unit 72h performs surface design on both surfaces of the progressive addition lens based on the lens surface shape (surface shape having the distribution diagram of FIG. 15) for which the determination unit 72f issues a determination result of OK (step S38).

In this way, information on the surface design of both surfaces is sent to the lens processing device 56, and the actual progressive addition lens 10 is manufactured.

[Design System of Progressive Addition Lens According to One Aspect of Present Invention]

The present invention also has technical significance as a design system for a progressive addition lens. A specific configuration of the system is as described below. Note that, hereinafter, various categories according to one aspect of the present invention may be obtained by appropriately combining the preferred embodiments described above.

"A design system of a progressive addition lens including:
a software module that adjusts a surface shape of a progressive addition lens so as to bring
the difference V between the state A when an object at the location O in front of the wearer by a finite distance and on a medial plane of the wearer is visually recognized and
the state B when an object at the location P positioned on side in a horizontal direction of the location O at a constant height in a vertical direction with respect to the location O is visually recognized in a plane that is parallel to a frontal plane and includes the location O at the time the progressive addition lens is worn
closer to
the difference W between the state C when an object at the location O is visually recognized and
the state D when an object at the location P is visually recognized at the time a reference single focal lens corresponding to the progressive addition lens is worn or at the time equivalent to the naked eye."

[Program Related to Design System of Progressive Addition Lens According to One Aspect of Present Invention]

The present invention also has technical significance as a program related to a design system of a progressive addition lens (hereinafter, also simply referred to as a program). A specific configuration of the system is as described below.

"A program related to the design system of a progressive addition lens that causes a computer (software module) to function to adjust a surface shape of a progressive addition lens so as to bring
the difference V between the state A when an object at the location O in front of the wearer by a finite distance and on a medial plane of the wearer is visually recognized and
the state B when an object at the location P positioned on side in a horizontal direction of the location O at a constant height in a vertical direction with respect to the location O is visually recognized in a plane that is parallel to a frontal plane and includes the location O at the time the progressive addition lens is worn
closer to
the difference W between the state C when an object at the location O is visually recognized and the state D when an object at the location P is visually recognized at the time a reference single focal lens corresponding to the progressive addition lens is worn or at the time equivalent to the naked eye."

[Manufacturing Method of Progressive Addition Lens According to One Aspect of Present Invention]

A manufacturing method of a progressive addition lens according to one aspect of the present invention includes a design step for performing the design method of a progressive addition lens described above, and a processing step for obtaining a progressive addition lens after the design step. As the content of a specific manufacturing method, a publicly-known content may be employed.

[Progressive Addition Lens According to One Aspect of Present Invention]

The present invention also has technical significance as a progressive addition lens. A specific configuration of the system is as described below.

"A progressive addition lens including: a near portion having power used for near vision; a distance portion having power for seeing an object farther than near vision; and an intermediate portion having a progressive action in which power changes progressively between the distance portion and the near portion, the progressive addition lens further including:

a prismatic effect adjustment region that brings a distortion degree of an image due to an unnecessary prismatic effect caused by a progressive action closer to a distortion degree of an image at the time a reference single focal lens corresponding to a progressive addition lens is worn or at the time equivalent to the naked eye."

The "distortion degree of an image due to an unnecessary prismatic effect caused by a progressive action" refers to, for example, the distortion in the depth direction and/or the eye position difference in the vertical direction in the content described with respect to [Design method of progressive addition lens according to one aspect of present invention].

To "bring a distortion degree of an image due to an unnecessary prismatic effect caused by a progressive action closer to a distortion degree of an image at the time a reference single focal lens corresponding to a progressive addition lens is worn or at the time equivalent to the naked eye" indicates a state where the lens surface shape is designed so as to bring the difference V closer to the difference W as described in [Details of design method of progressive addition lens according to one aspect of present invention].

The prismatic effect adjustment region preferably includes a region of a side portion deviating from the main line of sight in the horizontal direction.

Further, the position of the predetermined horizontal cross section is preferably a position where the addition power of 85% to 100% is achieved.

Further, the progressive addition lens according to one aspect of the present invention preferably satisfies at least either one of two conditions described below, and more preferably satisfies all of the conditions.

[First Condition]

in a plot when a lens horizontal direction is a horizontal axis and a surface prism difference in a vertical direction normalized by addition power is a vertical axis, a difference between a maximum value and a minimum value of a surface prism difference in the vertical direction in a predetermined location α on a predetermined horizontal cross section of the near portion is 0.2 [prism diopter/diopter] or more; and

[Second Condition]

In a plot when a lens horizontal direction is a horizontal axis and a surface prism difference in a horizontal direction normalized by addition power is a vertical axis, the absolute value of a surface prism difference in the horizontal direction at the position of x=0 in the predetermined location γ on a predetermined horizontal cross section of the near portion is 0.25 [prism diopter/diopter] or more. Note that the position of x=0 in the predetermined position γ is located directly below the prism reference point or directly below the midpoint of two alignment reference marks of the progressive addition lens. Further, x=0 is a prism reference point or a vertical line including the midpoint. The setting of x=0 in the plot relating to the surface prism difference in the present description similarly applies hereinafter.

[First condition] is a condition mainly related to the reduction of the eye position difference in the vertical direction. In a case where one aspect of the present invention is a pair of progressive addition lenses, an object is visually recognized through the pair of progressive addition lenses. At that time, the difference between the prism power in the vertical direction of the location a on the right eye lens through which the line of sight of the right eye passes and the prism power in the vertical direction of a location β on the left eye lens through which the line of sight of the left eye passes is defined as the surface prism difference in the vertical direction.

The method of obtaining the surface prism difference in the vertical direction in a case of using a pair of progressive addition lenses is as described below. Note that, in the present description, "normalized by addition power" indicates that the lens surface prism power is divided by the addition power set for the lens. Then, for all specific numerical limitations on the prism power in the present description, values normalized by the addition power are used. For example, the "surface prism difference in the vertical direction normalized by addition power", when explained by taking the description in the paragraph below as an example, means "a value obtained by subtracting the prism power (surface prism power) in the vertical direction normalized by the addition power in the predetermined location β from the prism power (surface prism power) in the vertical direction normalized by the addition power in the predetermined position α".

(Method of Obtaining Surface Prism Difference in Vertical Direction in Case of Using Pair of Progressive Addition Lenses)

1. In the lens surface prism power distribution normalized by the addition power with respect to the progressive addition lens with the origin as the midpoint of two hidden marks on the progressive addition lens, the predetermined location α away from the main line of sight in the right eye lens (at y=−14 mm, which may include the near reference point) by a distance d in a horizontal direction x is identified.

2. The predetermined location β that is away from the main line of sight in the left eye lens (at y=−14 mm that may include the near reference point) by the distance d in an opposite direction −x of the horizontal direction x is identified.

3. The value obtained by subtracting the prism power in the vertical direction in the predetermined location β from the prism power in the vertical direction in the predetermined location α is defined as the surface prism difference in the vertical direction in the predetermined location α.

Figure 17:
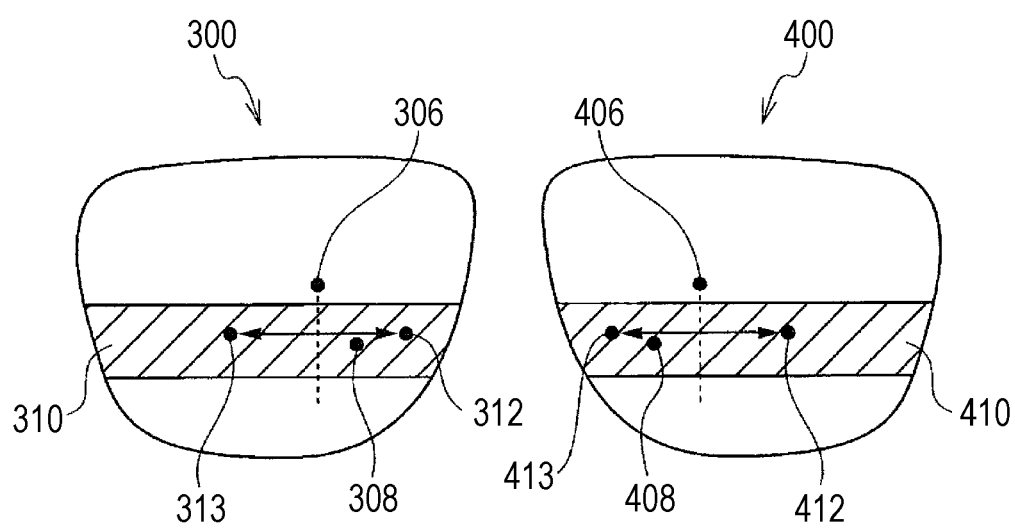
FIG. 17 is a diagram explaining a method of calculating distribution of a difference value from a lens surface prism power distribution in the right eye lens 300 and a left eye lens 400.

Note that, even if a single progressive addition lens is used instead of a pair of progressive addition lenses, [First condition] can be specified in a case where the left and right lenses have the same prescription power. This is because, in a case where the left and right lenses have the same prescription power, the right eye lens becomes the left eye lens by being made mirror-symmetrical (left-right symmetrical in the front view as shown in FIG. 17 described later), and the predetermined region α and the predetermined region β can be set on one progressive addition lens. An expression below is created based on this idea.

(Method of Obtaining Surface Prism Difference in Vertical Direction in Case of Using One Progressive Addition Lens) 1. In the lens surface prism power distribution normalized by the addition power with respect to the progressive addition lens with the origin as the midpoint of two hidden marks on the progressive addition lens, the horizontal direction x and the distance d, in and by which the predetermined location α is away from the main line of sight are identified.

2. The predetermined location β that is away from the predetermined location α by a distance 2d in the opposite direction −x of the direction x.

3. The value obtained by subtracting the prism power in the vertical direction in the predetermined location β from the prism power in the vertical direction in the predetermined location α is defined as the surface prism difference in the vertical direction in the predetermined location α.

As shown in the third embodiment, in a plot when the horizontal axis is the lens horizontal direction and the vertical axis is the surface prism difference in the vertical direction, the progressive addition lens in which the difference between a maximum value and a minimum value of the surface prism difference in the vertical direction is 0.2 [prism diopter/diopter] or more is a characteristic that the conventional progressive addition lens does not have. This is because, in one aspect of the present invention, it is intentionally set in this way in order to reduce the eye position difference in the vertical direction.

[Second condition] is a condition mainly related to the reduction of the distortion in the depth direction. In a case where one aspect of the present invention is a pair of progressive addition lenses, an object is visually recognized through the pair of progressive addition lenses. At that time, the difference between the prism power in the horizontal direction of the location γ on the right eye lens through which the line of sight of the right eye passes and the prism power in the horizontal direction of a location δ on the left eye lens through which the line of sight of the left eye passes is defined as the surface prism difference in the horizontal direction.

The method of obtaining the surface prism difference in the horizontal direction in a case of using a pair of progressive addition lenses is as described below.

(Method of Obtaining Surface Prism Difference in Vertical Direction in Case of Using Pair of Progressive Addition Lenses)

1. In the lens surface prism power distribution normalized by the addition power with respect to the progressive addition lens with the origin as the midpoint of two hidden marks on the progressive addition lens, the predetermined location γ (for example, y=−14 mm and x=0) on a predetermined horizontal cross section in the near portion is identified.

2. The predetermined location δ (for example, y=−14 mm and x=0) on a predetermined horizontal cross section in the near portion of the left eye lens is identified.

3. The value obtained by subtracting the prism power in the horizontal direction in the predetermined location δ from the prism power in the horizontal direction in the predetermined location γ is defined as the surface prism difference in the horizontal direction.

Note that, even if a single progressive addition lens is used instead of a pair of progressive addition lenses, [Second condition] can be specified in a case where the left and right lenses have the same prescription power. This is because, in a case where the left and right lenses have the same prescription power, the right eye lens becomes the left eye lens by being made left-right symmetrical, and the predetermined region γ and the predetermined region δ can be set on one progressive addition lens. An expression below is created based on this idea.

(Method of Obtaining Surface Prism Difference in Horizontal Direction in Case of Using One Progressive Addition Lens)

1. In the lens surface prism power distribution normalized by the addition power with respect to the progressive addition lens with the origin as the midpoint of two hidden marks on the progressive addition lens, the predetermined location γ (for example, y=−14 mm and x=0) on a predetermined horizontal cross section in the near portion is identified.

2. The absolute value of twice the prism power in the horizontal direction in the predetermined location γ is defined as the surface prism difference in the horizontal direction in the predetermined location γ.

In a case where the left and right lenses have the same prescription power, the left and right lens shapes are mirror-symmetrical. If the prism power in the horizontal direction at y=−14 mm and x=0 is 0.15 [prism diopter] in the right eye lens, the prism power in the horizontal at the same section in the left eye lens is −0.15 [prism diopter]. As a result, the absolute value of the surface prism difference in the horizontal direction is 0.30 [prism diopter].

As shown in the first embodiment described later, the progressive addition lens in which the absolute value of the surface prism difference in the horizontal direction in the portion of x=0 at y=−14 mm is 0.25 [prism diopter/diopter] or more is a characteristic that the conventional progressive addition lens does not have. This is because, in one aspect of the present invention, it is intentionally set in this way in order to reduce the distortion in the depth direction.

Note that it is also preferable to satisfy a condition described below.

[Third Condition]

A plot of the progressive addition lens when the horizontal axis is the direction of the line of sight (tan θ) and the vertical axis is the depth direction position information (unit: diopter) does not intersect a plot at the time the reference single focal lens corresponding to the progressive addition lens is worn or at the time equivalent to the naked eye.

[Third condition] is a condition mainly related to the reduction of the distortion in the depth direction. Therefore, [Third condition] may be applied instead of [Second condition] which is also for the condition related to the reduction of the distortion in the depth direction, or both [Second condition] and [Third condition] may be applied. As shown in the first embodiment described later, that a plot of the progressive addition lens when the horizontal axis is the direction of the line of sight (tan θ) and the vertical axis is the depth direction position information (unit: diopter) does not intersect a plot at the time the reference single focal lens corresponding to the progressive addition lens is worn or at the time equivalent to the naked eye indicates the content described below.

That is, it shows that, regardless of the direction of the line of sight, in either the reference lens or the lens of one aspect of the present invention, an image of an object obtained through the lens always exists in either the depth direction or the front direction when compared with the other lens. This contributes to the reduction of distortion in the depth direction. As a result, the influence generated by the unnecessary prismatic effect caused by the progressive action is reduced, and a comfortable wearing feeling can be obtained.

EMBODIMENT

Next, an embodiment will be shown and the present invention will be specifically described. As a matter of course, the present invention is not limited to the embodiment described below.

(Common to Each Embodiment)

In the embodiments described below, a pair of progressive addition lenses (hereinafter, a pair of spectacle lenses) was produced. The spectacle lens pair produced in each embodiment has a configuration described below.

That is, in a progressive addition lens pair including the right eye lens and the left eye lens, the right eye lens and the left eye lens of the progressive addition lens pair include a distance portion to which power for looking at a distance is set, a near portion including a portion to which near power obtained by adding addition power to distance power for looking nearby is set, and an intermediate portion in which power changes progressively between the distance portion and the near portion.

At this time, the right eye lens and the left eye lens include a prism adjustment region that approximates distortion of an image generated by the prismatic effect of the spectacle lens, specifically, a difference in the prismatic effect of the left eye lens and the right eye lens to distortion of an image generated by the prismatic effect of the lens surface shape of the reference lens set based on distance power or near power, specifically, a difference in the prismatic effect.

The prism adjustment region includes a region that realizes near power, and includes a near reference point of each of the right eye lens and the left eye lens, and a region other than a vertical line passing through the midpoint of two hidden marks provided on each of the right eye lens and the left on a horizontal line passing through the near reference point.

Figure 16:
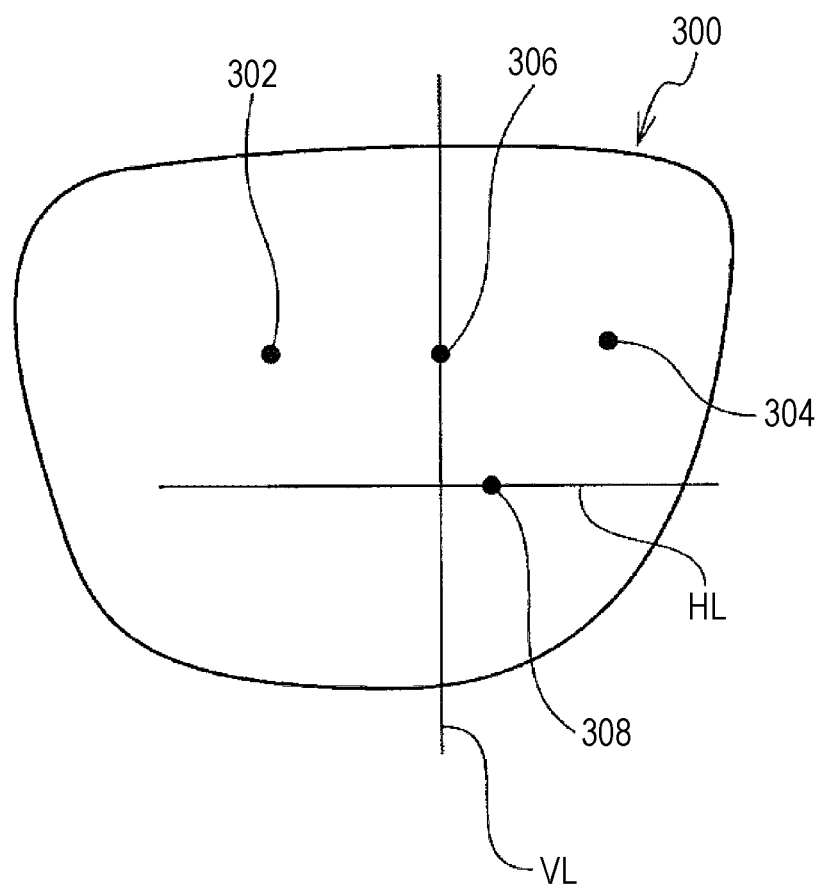
FIG. 16 is a diagram explaining an example of a spectacle lens 300 for the right eye of spectacle lens pairs of embodiments.

FIG. 16 is a diagram explaining an example of a spectacle lens 300 for the right eye of the spectacle lens pair of each embodiment.

The hidden marks 302 and 304 are shown in FIG. 16. The hidden marks 302 and 304 are specified in JIS and are alignment reference marks. The hidden marks 302 and 304 are provided at two points away in the horizontal direction from the lens center by 17 mm. Therefore, the horizontal direction of the spectacle lens 300 and the vertical direction orthogonal to the horizontal direction can be determined by the hidden marks 302 and 304. A midpoint 306 of the hidden marks 302 and 304 coincides with the center of the spectacle lens 300. The main line of sight passes in the vertical direction through the midpoint 306.

A near reference point 308 is positioned vertically downward of and closer to the nose side in the horizontal direction from the midpoint 306 and is usually specified by the manufacturer. For example, in a case of a progressive addition lens having the spherical power S of 0.00D, addition power ADD of 2.50D, and a corridor length of 14 mm, the near reference point 308 is at a position of 14 mm vertically downward of and 2.5 mm away to the nose side in the horizontal direction from the midpoint 306.

The prism adjustment region includes a region (near power measurement circle) that realizes near power (power obtained by adding the addition power ADD to the spherical power S of the distance portion), and includes the near reference point 308 and left and right regions other than the vertical line VL passing through the midpoint 306 on a horizontal line HL passing through the near reference point 308. In this region, which is part of the near portion and is used when looking at the side on the lower side, distortion of an image in the depth direction due to a difference in the prismatic effect with respect to the line of sight of each of the left eye and the right eye is easily generated. For this reason, the prism adjustment region includes left and right regions other than the vertical line VL on the horizontal line HL.

Further, according to one aspect of the present invention, the prism adjustment region preferably includes a near reference point. At the near reference point, the addition power ADD or the reference addition power displayed by the manufacturer is 100%, and, in particular, in a peripheral area including the near reference point, it is likely that distortion of an image in the depth direction generated by a difference in the prismatic effect and uncomfortable wearing feeling are felt. Accordingly, it is preferable that the prism adjustment region include the near reference point.

FIG. 17 is a diagram explaining a method of calculating distribution of a difference value from a lens surface prism power distribution in the right eye lens 300 and a left eye lens 400.

Here, a focus is placed on the lens surface prism power distribution normalized by the addition power ADD. The lens surface prism power normalized by the addition power ADD is defined as inclination in vertical direction×(refractive index of lens material−1)×100 [prism diopter]/addition power ADD [diopter] on one surface of lens surfaces on both sides of one lens. The inclination is a dimensionless value.

In the lens surface prism power distribution normalized by the addition power ADD of the right eye lens 300 and the left eye lens 400, the origin of the lens surface prism power distribution is set to the midpoint 306.

Furthermore, in the normalized lens surface prism power distribution, distribution of the difference values (surface prism differences in the vertical direction, which similarly applies hereinafter) between a component in the vertical direction of the lens surface prism power distribution of the right eye lens 300 on a horizontal cross section and a component in the vertical direction of the lens surface prism power distribution of the left eye lens 410 in the near portion of the right eye lens 300 and the left eye lens 400 is divided into a first region and a second region by a vertical line passing through the origin (the midpoint 306 and midpoint 406). The near portion may be, for example, regions 310 and 410 within a range away by a predetermined distance on the upper side and the lower side in the vertical direction around the near reference points 308 and 408. The predetermined distance is, for example, a distance within the range of 2.5 to 4 mm.

Here, the difference value is the difference between the values of the normalized lens surface prism powers at positions 312 and 412, which are away by the same distance from the origin (midpoint 306 and midpoint 406) to the same side (right side or left side) in the horizontal direction. For example, the value of the normalized lens surface prism power distribution of the left eye lens 400 is subtracted from the value of the normalized lens surface prism power distribution of the right eye lens 300.

Therefore, the first region is, for example, the difference value in the region on the right side from the vertical line passing through the origin (midpoint 306) of the right eye lens 300, specifically, the difference value of the values at the positions 312 and 412 away by the same distance on the right side in the horizontal direction from the origin (midpoint 306 and midpoint 406). The second region is, for example, the difference value in the region on the left side from the vertical line passing through the origin (midpoint 306) of the right eye lens 300, specifically, the difference value of the values at positions 313 and 413 away by the same distance on the left side in the horizontal direction from the origin (midpoint 306 and midpoint 406).

The right eye lens 300 and the left eye lens 400 have a prism adjustment region where the absolute value of the difference between a minimum difference value in one region and a maximum difference value in the other region between the first region and the second region of the distribution of the difference values determined as described above is 0.2 [prism diopter/diopter] or more. This specification corresponds to [First condition] described in [Progressive addition lens according to one aspect of present invention]. That is, in each embodiment, a spectacle lens pair satisfying [First condition] is manufactured.

Here, the surface prism difference in the vertical direction is exemplified. However, the surface prism difference in the horizontal direction can also be obtained by a similar method.

Note that a third embodiment shows that [First condition] is satisfied as specific data. Further, the first embodiment shows that the spectacle lens pair according to each embodiment also satisfies [Second condition].

First Embodiment

Since the explanation of the vertical axis, the horizontal axis, and the like in the graph and the like shown in the first embodiment has the same content for the same type of diagrams in the other embodiment, the description of the explanation in the other embodiment is omitted. The term "graph" in the present description may be read as "plot".

Among the prescription information for manufacturing the spectacle lens pair, the spherical power S was 0.00D [diopter], the addition power ADD was 2.50D [diopter], the corridor length was 14 mm, and the refractive index was 1.60.

The distance reference point was at the position 8 mm vertically upward from the spectacle lens center 240, and the near reference point was at the position 14 mm vertically downward and 2.5 mm away to the nose side in the horizontal direction from the spectacle lens center 240.

FIG. 18(a) shows a difference in directions of the line of sight between both eyes in the vertical direction, that is, distribution of an eye position difference in the vertical direction when a reference lens when a spectacle lens pair is manufactured, a lens of the first embodiment, and a conventional lens are worn, in which the horizontal axis represents a horizontal component of a direction of the line of sight and the vertical axis represents a vertical component of a direction of the line of sight.

FIG. 18(b) is a graph showing a change in an apparent position in the depth direction of a target object surface 22, that is, distortion in the depth direction, in which the vertical axis shows depth direction position information [diopter], and the horizontal axis shows a direction [tan θ] of the line of sight in the horizontal direction.

The origin of each of the distribution diagrams shown in FIG. 18(a) indicates the spectacle lens center 240 (prism measurement point). The positions on the horizontal axis and the vertical axis of each distribution diagram shown in FIG. 18(a) represent the direction of the line of sight as seen from the midpoint M of the centers of both eyes.

Figure 19:
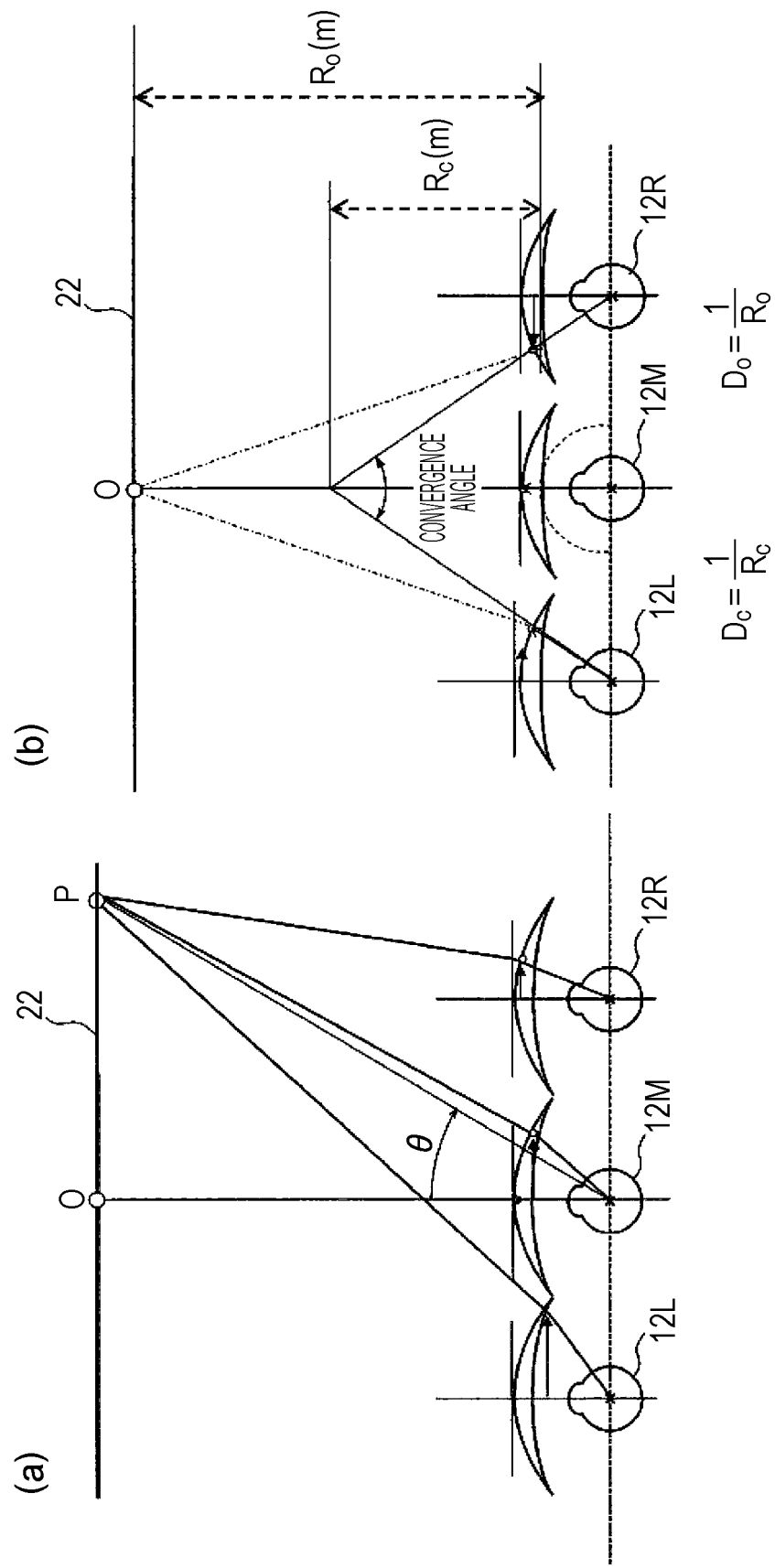
FIG. 19(a) is a diagram for explaining a direction of the line of sight in the horizontal direction, which is the horizontal axis in FIG. 18(b).
FIG. 19(b) is a diagram for explaining position information in the depth direction, which is the vertical axis in FIG. 18(b).

FIG. 19(a) is a diagram for explaining a direction of the line of sight in the horizontal direction, which is the horizontal axis in FIG. 18(b).

As shown in FIG. 19(a), when the center position of the integrated eye 12M is the center, the direction of the front view is the angle θ=0, and the angle formed by the direction of the line of sight traveling from the direction of the front view to the side in the horizontal direction and the direction of the front view is θ, the direction of the line of sight in the horizontal direction is shown as tan θ.

That is, the region shown in FIG. 18(a) represents the range of the viewing angle of θ=±48 degrees in the horizontal direction and the vertical direction, that is, 96 degrees. For example, in FIG. 18(a), when the direction of the line of sight is θ=48 degrees, the value on the horizontal axis in FIG. 18(b) is tan θ=1.11.

In FIG. 18(a), a level of the contour line is the eye position difference in the vertical direction in the line of sight between both eyes (obtained by subtracting the direction of the line of sight of the right eye from the direction of the line of sight of the left eye) in units of prism diopters. In each of the distribution diagrams, the smaller the absolute value, the smaller the eye position difference in the vertical direction.

In the distribution of the difference in the direction of the line of sight (eye position difference) between both eyes in the vertical direction shown in FIG. 18(a), the distribution of the spectacle lens of the first embodiment is shown to be close to the distribution of the reference lens as compared with the distribution of the conventional spectacle lens.

FIG. 19(b) is a diagram for explaining position information in the depth direction, which is the vertical axis in FIG. 18(b).

As shown in FIG. 19(b), a distance Rc in the depth direction at a reference intersection O seen through the lens is calculated using the angle (convergence angle) formed by the directions of the lines of sight between both eyes when gazing at the reference intersection O and the information of the interpupillary distance PD.

Furthermore, a distance Ro in the depth direction of an intersection P seen through the lens is calculated using the angle from the direction of the front view of the line of sight when gazing at the intersection P through the lens and the information of the interpupillary distance PD. Note that the distance Rc and the distance Ro are the distances when a point at which the vertical plane passing through the center of the integrated eye 12M and the reference intersection O intersects the integrated eye lens 10M is used as the base point.

Furthermore, the reciprocals of the calculated distances Rc and Ro are obtained and used as Dc and Do [diopter], respectively. The position information [diopter] in the depth direction, which is the vertical axis of the graph shown in FIG. 18(b), indicates Dc-Do. The smaller the Dc-Do, the less the apparent position in the depth direction of the intersection P does not deviate relatively from the apparent position in the depth direction when the reference intersection O is gazed at.

Further, while there is more position displacement in the depth direction of the target object surface 22 in the lens of the first embodiment shown in the graph shown in FIG. 18(b) as compared with the reference lens, a change amount Δ1 of a position in the depth direction in the lens of the first embodiment is shown to be smaller than a change amount Δ2 in the conventional lens.

The change amount Δ1 being small indicates that the change depending on the position along the horizontal direction of the apparent position in the depth direction of the apparent target object surface 20 seen through the lens is small. Therefore, the wearer wearing the spectacle lens pair 10 of the first embodiment is less likely to feel the distortion of an image in the depth direction, and the uncomfortable wearing feeling can be further reduced.

Further, in FIG. 18(b), it does not intersect with the plot at the time the reference single focal lens corresponding to the progressive addition lens is worn or at the time equivalent to the naked eye. That is, the lens of the first embodiment satisfies [Third condition]. This point similarly applies for the lens of a second embodiment described later.

Furthermore, in the first embodiment, [Second condition] described above was examined. The surface prism differences in the horizontal direction between the lens of the first embodiment and the conventional lens are summarized.

Figure 20:
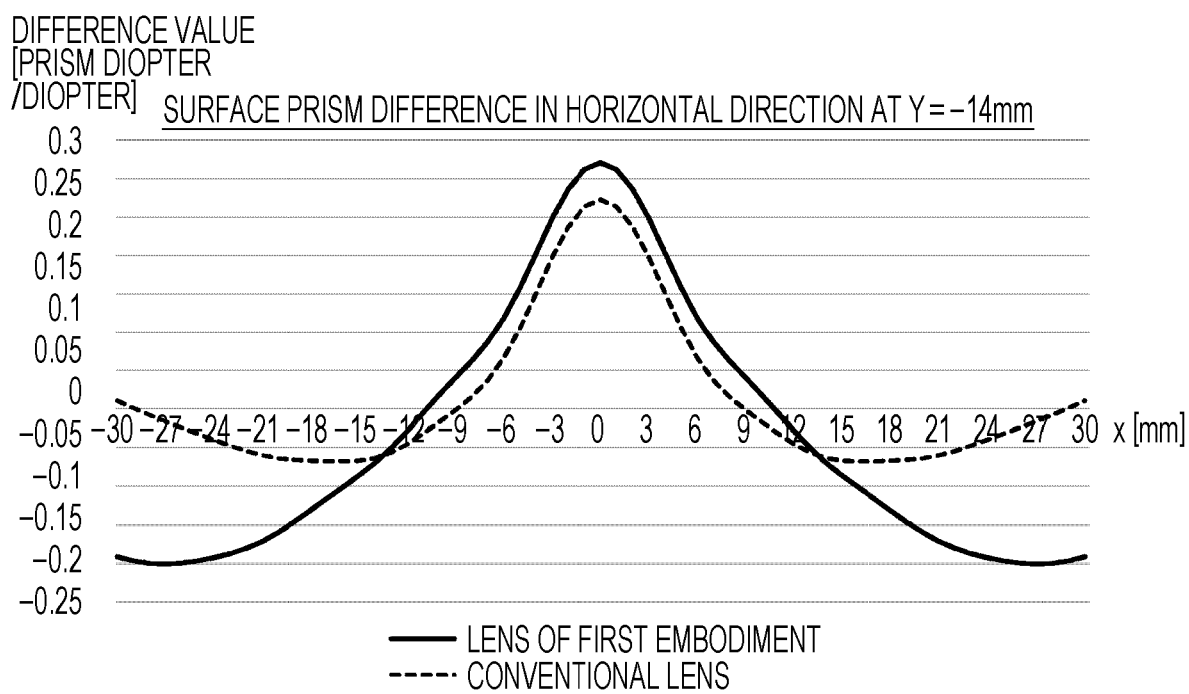
FIG. 20 is a diagram showing a change in a surface prism difference in the horizontal direction in the lens of the first embodiment and a conventional lens, in which the vertical axis shows a surface prism difference [prism diopter/diopter] in the horizontal direction and the horizontal axis shows an x coordinate [mm] on y=−14 mm.

FIG. 20 is a diagram showing a change in the surface prism difference in the horizontal direction in the lens of the first embodiment and the conventional lens, in which the vertical axis shows the surface prism difference [prism diopter/diopter] in the horizontal direction and the horizontal axis shows an x coordinate [mm] on y=−14 mm.

As shown in FIG. 20, in the lens of the first embodiment, the absolute value of the surface prism difference in the horizontal direction was 0.25 [prism diopter/diopter] or more at the position of x=0 in a predetermined location γ on a predetermined horizontal cross section (y=−14 mm) in the near portion, while this was not the case in the lens of the conventional example.

Note that, also in the second embodiment and the third embodiment described later, when a graph (not shown) corresponding to FIG. 20 was created, a relationship similar to that in FIG. 20 was obtained.

It was found that by employing the design method of a progressive addition lens according to one aspect of the present invention, the directions of the lines of sight in the vertical direction of both eyes can be aligned like the reference lens for the lens of the first embodiment. As a result, it was found that the unpleasant wearing feeling caused to the wearer can be reduced.

Second Embodiment

Among the prescription information for manufacturing the spectacle lens pair, the spherical power S was −4.00D [diopter], the addition power ADD was 2.50D [diopter], the corridor length was 14 mm, and the refractive index was 1.60.

The distance reference point was at the position 8 mm vertically upward from the spectacle lens center 240, and the near reference point was at the position 14 mm vertically downward and 2.3 mm away to the nose side in the horizontal direction from the spectacle lens center 240.

FIG. 21(a) shows a difference in directions of the lines of sight between both eyes in the vertical direction, that is, distribution of eye position differences in the vertical direction when a reference lens when a spectacle lens pair is manufactured, a lens of the second embodiment, and the conventional lens are worn, in which the horizontal axis represents a horizontal component of a direction of the line of sight and the vertical axis represents a vertical component of a direction of the line of sight.

FIG. 21(b) is a graph showing a change in an apparent position in the depth direction of a target object surface 22, that is, distortion in the depth direction, in which the vertical axis shows depth direction position information [diopter], and the horizontal axis shows a direction [tan θ] of the line of sight in the horizontal direction.

In the distribution of the difference in the direction of the line of sight (eye position difference) between both eyes in the vertical direction shown in FIG. 21(a), the distribution of the spectacle lens of the second embodiment is shown to be close to the distribution of the reference lens as compared with the distribution of the conventional spectacle lens.

Further, while there is more position displacement in the depth direction of the target object surface 22 in the lens of the second embodiment shown in the graph shown in FIG. 21(b) as compared with the reference lens, a change amount of a position in the depth direction in the lens of the second embodiment is shown to be smaller than a change amount in the conventional lens.

It was found that by employing the design method of a progressive addition lens according to one aspect of the present invention, the directions of the lines of sight in the vertical direction of both eyes can be aligned like the reference lens for the lens of the second embodiment. As a result, it was found that the unpleasant wearing feeling caused to the wearer can be reduced.

Third Embodiment

Among the prescription information for manufacturing the spectacle lens pair, the spherical power S was 0.00D [diopter], the addition power ADD was 2.50D [diopter], the corridor length was 14 mm, and the refractive index was 1.60.

The distance reference point was at the position 8 mm vertically upward from the spectacle lens center 240, and the near reference point was at the position 14 mm vertically downward and 2.5 mm away to the nose side in the horizontal direction from the spectacle lens center 240.

FIG. 22 is a diagram showing a change in a surface prism difference in the vertical direction in the lens of the third embodiment and the conventional lens, in which the vertical axis shows a surface prism difference [prism diopter/diopter] in the vertical direction and the horizontal axis shows an x coordinate [mm] on y=−14 mm. Note that FIG. 20 mentioned above relates to the surface prism difference in the "horizontal direction".

As shown in FIG. 22, in the case of the spectacle lens of the third embodiment, the absolute value of the difference between a minimum difference value in one region and a maximum difference value in the other region between the first region and the second region in FIG. 21 is 0.2 [prism diopter/diopter] or more. On the other hand, in the case of the conventional spectacle lens, the absolute value of the difference between the minimum difference value and the maximum difference value is less than 0.2 [prism diopter/diopter].

As described above, the absolute value of the difference between the minimum difference value and the maximum difference value of the progressive addition lens of the third embodiment is larger than that of the conventional progressive addition lens, because the lens surface shape was adjusted by employing the design method of the progressive power lens according to one aspect of the present invention. Specifically, this is because the difference in the prismatic effect on the line of sight of each of the left eye and the right eye was adjusted.

That is, in the spectacle lens pair of the progressive addition lens, the difference in the prismatic effect at positions at the same distance from the origin in the region in the left direction across the origin (midpoint 306) of the right eye lens 300 and the region in the left direction across the origin (midpoint 406) of the left eye lens 400 is increased as compared to that of the conventional spectacle lens pair, and similarly, the difference in the prismatic effect at positions at the same distance from the origin of the region in the right direction across the origin (midpoint 306) of the right eye lens 300 and the region in the right direction across the origin (midpoint 406) of the left eye lens 400 is increased as compared to that of the conventional spectacle lens pair.

In this manner, by adjusting the difference in the prismatic effect, it is possible to bring the difference in the prismatic effect closer to that in the reference lens without an unpleasant wearing feeling. For this reason, the unpleasant wearing feeling generated by the difference in the prismatic effect can be reduced in consideration of the difference in the directions of the line of sight of both eyes of the wearer of the spectacle lens.

According to each embodiment, it is preferable that the positions of the regions 310 and 410 for obtaining the distribution of the difference values shown in FIG. 21 be the positions where the addition power ADD of 85% to 100% is achieved. In particular, since this region is a region in which the distortion of the image and the unpleasant wearing feeling generated by the difference in the prismatic effect is easily felt, the effect of improving the distortion of the image and the unpleasant wearing feeling becomes large.

SUMMARY

The "design method, manufacturing method, and design system of progressive addition lens, and progressive addition lens" of the present disclosure will be summarized as described below.

One embodiment of the present disclosure is as described below.

A design method of a progressive addition lens including
adjusting a surface shape of a progressive addition lens so as to bring
the difference V between the state A when an object at the location O in front of the wearer by a finite distance and on a medial plane of the wearer is visually recognized and
the state B when an object at the location P positioned on the side in the horizontal direction of the location O at a constant height in the vertical direction with respect to the location O is visually recognized in a plane that is parallel to a frontal plane and includes the location O at the time the progressive addition lens is worn
closer to
the difference W between the state C when an object at the location O is visually recognized and
the state D when an object at the location P is visually recognized at the time a reference single focal lens corresponding to the progressive addition lens is worn or at the time equivalent to the naked eye.

REFERENCE SIGNS LIST

10 Progressive addition lens
10L Left eye lens
10R Right eye lens
10M Integrated eye lens
12L Left eye
12R Right eye
12M Integrated eye
20 Apparent target object surface (apparent surface)
22 Target object surface (actual surface)
30L Reference single focal lens for right eye
30R Reference single focal lens for left eye
30M Single focal lens for integrated eye
50 System
52, 54 Spectacle store terminal
56 Lens processing device
60 Spectacle lens pair design device
62 CPU
64 ROM
66 RAM
68 Communication unit
70 Input operation unit
71 Display
72 Software module
72a Integrated eye lens design unit
72b Target object surface setting unit
72c Lens pair design unit
72d Reference lens design unit
72e Line-of-sight calculation unit
72f Determination unit
72g Surface shape adjustment unit
72h Lens surface design unit
100 (Conventional) spectacle lens pair
100L (Conventional) right eye lens
100R (Conventional) left eye lens
200 Main line of sight
210L Left eye lens (initially designed)
210R Right eye lens (initially designed)
220 Distance reference point
230, 308, 408 Near reference point
240 Spectacle lens center (prism measurement point)
302, 304 Hidden mark
306, 406 Midpoint
310, 410 Region

The invention claimed is:

1. A design method of a progressive addition lens, the design method comprising:
adjusting a surface shape of a progressive addition lens to bring a difference V between a state A and a state B closer to a difference W between a state C and a state D, wherein
the state A is when an object at a location O is visually recognized, and the location O is in front of a wearer by a finite distance and on a medial plane of the wearer,
the state B is when an object at a location P is visually recognized while the progressive addition lens is worn, the location P is on a side in a horizontal direction of the location O at a constant height in a vertical direction with respect to the location O, and the location P is in a plane that is parallel to a frontal plane,
the state C is when the object at the location O is visually recognized, and
the state D is state when the object at the location P is visually recognized while a reference single focal lens corresponding to the progressive addition lens is worn or while no lens is worn, wherein
the difference V is between an angular difference VA and an angular difference VB, wherein the angular difference VA is between a direction of a line of sight of a right eye and a direction of a line of sight of a left eye in the state A, and the angular difference VB is between a direction of a line of sight of a right eye and a direction of a line of sight of a left eye in the state B, the difference W is between an angular difference WC and an angular difference WD, wherein the angular difference WC is between a direction of a line of sight of a right eye and a direction of a line of sight of a left eye in the state C, and the angular difference WD is between a direction of a line of sight of a right eye and a direction of a line of sight of a left eye in the state D, and the surface shape of the progressive addition lens is adjusted to change the angular difference VB in the state B so that the difference V is within a predetermined allowable range of the difference W.

2. The design method of the progressive addition lens according to claim 1, wherein with an integrated eye with a center of rotation set on a medial plane of a wearer and at an intermediate position between a right eye and a left eye and a progressive addition lens for an integrated eye, the angular difference VA is between an angular difference VAR and an angular difference VAL, wherein the angular difference VAR is between a direction of a line of sight of a right eye and a direction of a line of sight of an integrated eye, and the angular difference VAL is between a direction of a line of sight of a left eye and a direction of a line of sight of an integrated eye in the state A, the angular difference VB is between an angular difference VBR and an angular difference VBL, wherein the angular difference VBR is between a direction of a line of sight of a right eye and a direction of a line of sight of an integrated eye, and the angular difference VBL is between a direction of a line of sight of a left eye and a direction of a line of sight of an integrated eye in the state B, the angular difference WC is between an angular difference WCR and an angular difference WCL, wherein the angular difference WCR is between a direction of a line of sight of a right eye and a direction of a line of sight of an integrated eye, and the angular difference WCL is between a direction of a line of sight of a left eye and a direction of a line of sight of an integrated eye in the state C, and the angular difference WD is between an angular difference WDR and an angular difference WDL, wherein the angular difference WDR is between a direction of a line of sight of a right eye and a direction of a line of sight of an integrated eye, and the angular difference WDL is between a direction of a line of sight of a left eye and a direction of a line of sight of an integrated eye in the state D.

3. The design method of the progressive addition lens according to claim 2, wherein a correction amount for the progressive addition lens for a right eye and a correction amount for the progressive addition lens for a left eye when the surface shape of the progressive addition lens is adjusted are apportioned according to at least one of a ratio of the angular difference VAR to the angular difference VAL, a ratio of the angular difference VBR to the angular difference VBL, a ratio of the angular difference WCR to the angular difference WCL, and a ratio of the angular difference WDR to the angular difference WDL.

4. The design method of the progressive addition lens according to claim 2, wherein an equivalent spherical power of a progressive addition lens for the integrated eye is an average value of an equivalent spherical power of a progressive addition lens for a right eye and an equivalent spherical power of a progressive addition lens for a left eye.

5. The design method of the progressive addition lens according to claim 1, wherein a predetermined allowable range from the difference W is within 50% of the difference W.

6. A manufacturing method comprising:
performing the design method of the progressive addition lens according to claim 1; and
obtaining the progressive addition lens after performing the design method.

7. A design system of a progressive addition lens, the design system comprising:
a processor configured to adjust a surface shape of a progressive addition lens to bring a difference V between a state A and a state B closer to a difference W between a state C a state D, wherein the state A is when an object at a location O is visually recognized, and the location O is in front of a wearer by a finite distance and on a medial plane of the wearer, the state B is when an object at a location P is visually recognized while the progressive addition lens is worn, the location P is on a side in a horizontal direction of the location O at a constant height in a vertical direction with respect to the location O, and the location P is in a plane that is parallel to a frontal plane, the state C is when the object at the location O is visually recognized, and the state D is when the object at the location P is visually recognized while a reference single focal lens corresponding to the progressive addition lens is worn or while no lens is worn, wherein the difference V is between an angular difference VA and an angular difference VB, wherein the angular difference VA is between a direction of a line of sight of a right eye and a direction of a line of sight of a left eye in the state A, and the angular difference VB is between a direction of a line of sight of a right eye and a direction of a line of sight of a left eye in the state B, the difference W is between an angular difference WC and an angular difference WD, wherein the angular difference WC is between a direction of a line of sight of a right eye and a direction of a line of sight of a left eye in the state C, and the angular difference WD is between a direction of a line of sight of a right eye and a direction of a line of sight of a left eye in the state D, and the surface shape of the progressive addition lens is adjusted to change the angular difference VB in the state B so that the difference V is within a predetermined allowable range of the difference W.

8. A progressive addition lens comprising:
a near portion having power used for near vision;
a distance portion having power for seeing an object farther than near vision;
an intermediate portion having a progressive action in which power changes progressively between the distance portion and the near portion; and
a prismatic effect adjustment region that brings a distortion degree of an image due to an unnecessary prismatic effect caused by a progressive action closer to a distortion degree of an image while a reference single focal lens corresponding to a progressive addition lens is worn or while no lens is worn, wherein the prismatic effect adjustment region satisfies at least one of following two conditions:

in a plot when a lens horizontal direction is a horizontal axis and a surface prism difference in a vertical direction normalized by addition power is a vertical axis, a difference between a maximum value and a minimum value of a surface prism difference in the vertical direction in a predetermined location α on a predetermined horizontal cross section of the near portion is 0.2 prism diopter/diopter or more; and in a plot when a lens horizontal direction is a horizontal axis and a surface prism difference in a horizontal direction normalized by addition power is a vertical axis, an absolute value of a surface prism difference in the horizontal direction is 0.25 prism diopter/diopter or more at a position of x=0 in a predetermined location γ on a predetermined horizontal cross section of the near portion, and a position of x=0 in the predetermined location γ is directly below a prism reference point or directly below a midpoint of two alignment reference marks of a progressive addition lens; and wherein a position of the predetermined horizontal cross section is where addition power is 85% to 100%.

9. The progressive addition lens according to claim 8, wherein the prismatic effect adjustment region includes a region of a side portion deviating in a horizontal direction from a main line of sight.

10. The progressive addition lens according to claim 8, wherein the prismatic effect adjustment region satisfies following condition:

a plot of the progressive addition lens, where the horizontal axis is a tangent of a line of sight angle and the vertical axis is depth direction position in diopters, does not intersect an equivalent plot of the reference single focal lens corresponding to the progressive addition lens or of the naked eye.

\* \* \* \* \*